(12) United States Patent
Xu et al.

(10) Patent No.: US 10,021,574 B2
(45) Date of Patent: Jul. 10, 2018

(54) SPECTRUM SHARING METHOD AND APPARATUS

(71) Applicant: Huawei Technologies Co., Ltd., Shenzhen (CN)

(72) Inventors: Bin Xu, Shanghai (CN); Guohua Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/719,786

(22) Filed: Sep. 29, 2017

(65) Prior Publication Data

US 2018/0027419 A1    Jan. 25, 2018

Related U.S. Application Data

(63) Continuation of application No. PCT/CN2015/075496, filed on Mar. 31, 2015.

(51) Int. Cl.
*H04W 72/00* (2009.01)
*H04W 16/14* (2009.01)
(Continued)

(52) U.S. Cl.
CPC ......... *H04W 16/14* (2013.01); *H04W 52/367* (2013.01); *H04W 72/0486* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS

| 8,184,578 B2 * | 5/2012 | Kazmi | H04W 16/10 370/329 |
| 2006/0240831 A1 * | 10/2006 | Toskala | H04W 36/0055 455/436 |

(Continued)

FOREIGN PATENT DOCUMENTS

| CN | 101816138 A | 8/2010 |
| CN | 103229530 A | 7/2013 |

(Continued)

OTHER PUBLICATIONS

"Extending Rel-8/9 ICIC for Heterogeneous Network," Agenda item: 6.8, Source: LG Electronics, Document for: Discussion and Decision, 3GPP TSG RAN WG1 Meeting #60bis, R1-102430, Apr. 12-16, 2010, 4 pages.

(Continued)

*Primary Examiner* — Dai A Phuong
(74) *Attorney, Agent, or Firm* — Slater Matsil, LLP

(57) ABSTRACT

A spectrum sharing method includes a first base station (BS) establishes a first sharing cell of a first-standard network at a shared frequency, establishes a service of a user equipment (UE) of the first-standard network in the first sharing cell, and transmits data on a Traffic Radio Bearer (TRB) of the first UE. A second BS establishes a second sharing cell at the shared frequency, and establishes a service of a second UE of the second-standard network in the second sharing cell. When the shared frequency is shared, the first BS suspends the data transmission on the TRB of the service of the first UE, and retains a common channel of the first sharing cell and a SRB of the service of the UE of the first-standard network. The second BS then starts data transmission on the TRB of the service of the second UE.

20 Claims, 8 Drawing Sheets

(51) Int. Cl.
*H04W 52/36* (2009.01)
*H04W 72/04* (2009.01)

(58) Field of Classification Search
CPC ..... H04W 16/32; H04W 24/00; H04W 28/04; H04W 72/082; H04W 4/02; H04W 64/00; H04W 29/08657
USPC ....... 455/432.1, 436–453, 456.1–456.3, 513; 370/329–334
See application file for complete search history.

(56) References Cited

U.S. PATENT DOCUMENTS

| | | | |
|---|---|---|---|
| 2007/0149206 A1* | 6/2007 | Wang | H04W 36/0077 455/450 |
| 2009/0059856 A1 | 3/2009 | Kermoal et al. | |
| 2011/0319030 A1* | 12/2011 | Kondo | H04W 52/0206 455/67.11 |
| 2013/0344872 A1* | 12/2013 | Nukala | H04W 36/14 455/437 |
| 2014/0018053 A1* | 1/2014 | Cho | G06F 3/0488 455/418 |
| 2014/0248897 A1* | 9/2014 | Sfar | H04W 28/08 455/453 |
| 2014/0308968 A1 | 10/2014 | Xiao et al. | |
| 2014/0315561 A1 | 10/2014 | Hooli et al. | |
| 2016/0135057 A1 | 5/2016 | Wang et al. | |
| 2016/0270112 A1* | 9/2016 | Dinan | H04L 5/00 |
| 2017/0013468 A1 | 1/2017 | Zhu et al. | |
| 2018/0084541 A1* | 3/2018 | Dinan | H04W 72/0413 |

FOREIGN PATENT DOCUMENTS

| | | |
|---|---|---|
| CN | 103379498 A | 10/2013 |
| CN | 103533552 A | 1/2014 |
| CN | 103763708 A | 4/2014 |
| CN | 104272785 A | 1/2015 |
| EP | 2761912 A1 | 8/2014 |
| EP | 3101938 A1 | 12/2016 |
| WO | 2009068727 A1 | 6/2009 |
| WO | 2013045741 A1 | 4/2013 |
| WO | 2015006954 A1 | 1/2015 |

OTHER PUBLICATIONS

"Inter-Cell Interference Mitigation for EUTRA," Source: Texas Instruments, Agenda Item: 8.3, Document for: Discussion, 3GPP TSG RAN WG1, R1-051059, Oct. 10-14, 2005, 7 pages.

Wen, Z. et al., "Survey on Dynamic Spectrum Allocation and Spectrum Sharing," Department of Communication Engineering, Chengdu University of Technology, China, vol. 41, No. 7, 2008, 3 pages.

* cited by examiner

SPECTRUM SHARING METHOD AND APPARATUS

CROSS-REFERENCE TO RELATED APPLICATIONS

This application is a continuation of International Application No. PCT/CN2015/075496, filed on Mar. 31, 2015, the disclosure of which is hereby incorporated by reference in its entirety.

TECHNICAL FIELD

The present invention pertains to the field of wireless communications, and in particular, to a spectrum sharing method and apparatus.

BACKGROUND

A spectrum is a most precious and tensest resource in a wireless communications system. With continuous acceleration of Long Term Evolution (LTE) network construction, many operators face a problem of LTE network spectrum resource shortage. As a user of a Universal Mobile Telecommunications System (UMTS) network gradually uses the LTE network instead, an operator gradually changes a spectrum resource of the UMTS network into a spectrum resource of the LTE network. This is a process of refarming (Re-farming) from the UMTS network to the LTE network.

In the prior art, there is a half-static UMTS/LTE refarmingsolution. That is, the operator transforms, in a half-static manner according to a cell traffic busy/idle state of the UMTS network, one or some frequencies of 5 MHz in the UMTS network for use in an LTE network. In an idle traffic time period (for example, 0:00 to 6:00 early in the morning), a NodeB determines whether a quantity of users in a cell at a specific frequency of 5 MHz in the UMTS network is less than a specific threshold (for example, 3). If yes, the users in the cell are compelled to be handed over to a cell at another frequency in the UMTS network. Then, the frequency of 5 MHz in the UMTS network is transformed for use in the LTE network. When a cell at another frequency in the UMTS network encounters a situation of busy traffic, or a current time does not belong to an idle traffic time period that can be shared, the UMTS network may immediately apply to the LTE network for repossessing the frequency of 5 MHz in the UMTS network. A manner of releasing a frequency by the UMTS network is: The UMTS network first deletes a cell at the frequency, and then the LTE network establishes a cell at the frequency. The LTE network can formally use the frequency only after the cell in the LTE network is successfully established. A manner of repossessing a frequency by the UMTS network is: The LTE network first deletes a cell at the frequency, and then the UMTS network establishes a cell at the frequency. The UMTS network repossesses the frequency only after the cell in the UMTS network is successfully established.

However, the prior art has at least the following problem: The half-static UMTS/LTE refarming solution relates to a process of frequently establishing and deleting a cell in the UMTS network and a cell in the LTE network. Therefore, a spectrum handover process lasts for at least 10 seconds. Within a spectrum handover time, neither the UMTS network nor the LTE network is capable of processing any traffic. Therefore, the half-static UMTS/LTE refarming solution leads to spectrum resource waste.

SUMMARY

Embodiments of the present invention provide a spectrum sharing method and apparatus, to improve spectrum resource utilization during spectrum sharing.

A first aspect provides a spectrum sharing method, including establishing, by a first base station, a first sharing cell of a first-standard network at a shared frequency, establishing, by the first base station, a service of user equipment of the first-standard network in the first sharing cell, and transmitting, by the first base station, data on a data radio bearer of the service of the user equipment of the first-standard network, establishing, by a second base station, a second sharing cell of a second-standard network at the shared frequency, establishing, by the second base station, a service of user equipment of the second-standard network in the second sharing cell; and, when the first sharing cell and the second sharing cell share the shared frequency, suspending, by the first base station, the data transmission on the data radio bearer of the service of the user equipment of the first-standard network, and retaining a common channel of the first sharing cell and a signaling radio bearer of the service of the user equipment of the first-standard network, and starting, by the second base station, data transmission on a data radio bearer of the service of the user equipment of the second-standard network.

In a first possible implementation of the first aspect, the second-standard network further includes a base cell, and the method further includes: obtaining, by the first base station, load information of the base cell of the second-standard network; obtaining, by the first base station, load information of the first sharing cell, and determining, by the first base station according to the load information of the base cell of the second-standard network and the load information of the first sharing cell, whether the first sharing cell and the second sharing cell share the shared frequency.

With reference to the first possible implementation of the first aspect, in a second possible implementation of the first aspect, the load information of the base cell of the second-standard network includes radio bearer utilization, and the determining, by the first base station according to the load information of the base cell of the second-standard network and the load information of the first sharing cell, whether the first sharing cell and the second sharing cell share the shared frequency includes, when the radio bearer utilization of the base cell of the second-standard network is greater than a first threshold and the load information of the first sharing cell is less than a second threshold, determining, by the first base station, that the first sharing cell and the second sharing cell share the shared frequency.

With reference to the second possible implementation of the first aspect, in a third possible implementation of the first aspect, the method further includes: determining, by the first base station according to the load information of the first sharing cell, duration of the data transmission on the data radio bearer of the service of the user equipment of the second-standard network.

With reference to the third possible implementation of the first aspect, in a fourth possible implementation of the first aspect, the load information of the first sharing cell includes a proportion of cell transmitted carrier power to maximum cell transmit power; and the determining, by the first base station according to the load information of the first sharing cell, duration of the data transmission on the data radio bearer of the service of the user equipment of the second-standard network includes determining, by the first base station according to the proportion of the cell transmitted carrier power to the maximum cell transmit power, the duration of the data transmission on the data radio bearer of the service of the user equipment of the second-standard network, where the duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

With reference to the second possible implementation of the first aspect, in a fifth possible implementation of the first aspect, the method further includes: when the first sharing cell and the second sharing cell share the shared frequency, using, by the second base station, an average value of last N1 channel quality indicator values of the second sharing cell in last sharing as a channel quality indicator value that is in a first time period that is an initial time period in current sharing of the second sharing cell, where N1 is a positive integer.

In a sixth possible implementation of the first aspect, the second-standard network further includes a base cell, after the first sharing cell and the second sharing cell share the shared frequency, the method further includes, obtaining, by the first base station, load information of the base cell of the second-standard network; obtaining, by the first base station, load information of the first sharing cell, and determining, by the first base station according to the load information of the base cell of the second-standard network and the load information of the first sharing cell, whether the first sharing cell and the second sharing cell continue to share the shared frequency.

With reference to the sixth possible implementation of the first aspect, in a seventh possible implementation of the first aspect, the load information of the base cell of the second-standard network includes the radio bearer utilization, and the determining, by the first base station according to the load information of the base cell of the second-standard network and the load information of the first sharing cell, whether the first sharing cell and the second sharing cell continue to share the shared frequency includes determining, by the first base station when the radio bearer utilization of the base cell of the second-standard network is less than or equal to the first threshold or the load information of the first sharing cell is greater than or equal to the second threshold, that the first sharing cell and the second sharing cell do not continue to share the shared frequency.

With reference to the seventh possible implementation of the first aspect, in an eighth possible implementation of the first aspect, the load information of the first sharing cell includes at least one of a quantity of dedicated channel users of the first-standard network, non-high-speed downlink packet access power, and the proportion of cell transmitted carrier power to maximum cell transmit power, and the second threshold includes at least one of a first sub-threshold, a second sub-threshold, and a third sub-threshold; and the determining, by the first base station when the radio bearer utilization of the base cell of the second-standard network is less than or equal to the first threshold or the load information of the first sharing cell is greater than or equal to the second threshold, that the first sharing cell and the second sharing cell do not continue to share the shared frequency includes: when at least one of the following conditions is met: the quantity of dedicated channel users of the first-standard network is greater than or equal to the first sub-threshold, the non-high-speed downlink packet access power is greater than or equal to the second sub-threshold, and the proportion of the cell transmitted carrier power to the maximum cell transmit power is greater than or equal to the third sub-threshold, determining, by the first base station, that the first sharing cell and the second sharing cell do not continue to share the shared frequency.

With reference to the seventh possible implementation of the first aspect, in a ninth possible implementation of the first aspect, the method further includes: when the first base station determines that the first sharing cell and the second sharing cell do not continue to share the shared frequency, suspending, by the second base station, the data transmission on the data radio bearer of the service of the user equipment of the second-standard network; and starting, by the first base station, the data transmission on the data radio bearer of the service of the user equipment of the first-standard network, and retaining the common channel of the first sharing cell and the signaling radio bearer of the service of the user equipment of the first-standard network.

With reference to the seventh possible implementation of the first aspect, in a tenth possible implementation of the first aspect, the method further includes: when the first sharing cell and the second sharing cell do not continue to share the shared frequency, using, by the first base station, an average value of last N2 channel quality indicator values of the first sharing cell in last non-sharing as a channel quality indicator value that is in a second time period that is an initial time period in current non-sharing of the first sharing cell, where N2 is a positive integer.

With reference to the first possible implementation of the first aspect, in an eleventh possible implementation of the first aspect, the first-standard network further includes a base cell, and the method further includes, when the load information of the base cell of the second-standard network is greater than the first threshold and the load information of the first sharing cell is greater than or equal to the second threshold, obtaining, by the first base station, load information of the base cell of the first-standard network; and when the load information of the base cell of the first-standard network is less than a third threshold, handing over, by the first base station, some user equipment in the first sharing cell to the base cell of the first-standard network.

With reference to the eleventh possible implementation of the first aspect, in a twelfth possible implementation of the first aspect, the method further includes: when the load information of the first sharing cell is less than a fourth threshold and the load information of the base cell of the first-standard network is greater than a fifth threshold, handing over, by the first base station, some user equipment in the base cell of the first-standard network to the first sharing cell.

With reference to the eleventh possible implementation of the first aspect or the twelfth possible implementation of the first aspect, in a thirteenth possible implementation of the first aspect, the method further includes receiving, by the first base station, a cell establishment message delivered by a radio network controller; and establishing, by the first base station, the first sharing cell according to the cell establishment message.

With reference to the thirteenth possible implementation of the first aspect, in a fourteenth possible implementation of the first aspect, the cell establishment message includes user equipment handover information, and the user equipment handover information is used to adjust at least one of the third threshold, the fourth threshold, and the fifth threshold.

In a fifteenth possible implementation of the first aspect, the first base station and the second base station are co-site base stations, and the first base station and the second base station share a clock source.

In a sixteenth possible implementation of the first aspect, the first sharing cell and the second sharing cell are co-sector cells.

With reference to the first possible implementation of the first aspect or the sixth possible implementation of the first aspect, in a seventeenth possible implementation of the first aspect, the base cell of the second-standard network and the second sharing cell are co-sector cells.

With reference to the first possible implementation of the first aspect or the sixth possible implementation of the first aspect, in an eighteenth possible implementation of the first aspect, the first sharing cell is one first sharing cell established by the first base station, and the load information of the first sharing cell is load information of the one first sharing cell.

With reference to the first possible implementation of the first aspect or the sixth possible implementation of the first aspect, in a nineteenth possible implementation of the first aspect, the first sharing cell is multiple first sharing cells established by the base station, and the load information of the first sharing cell is average load information of the multiple first sharing cells.

A second aspect provides a spectrum sharing apparatus, including a first cell processing unit, configured to establish a first sharing cell of a first-standard network at a shared frequency, a first service processing unit, configured to: establish a service of user equipment of the first-standard network in the first sharing cell, and transmit data on a data radio bearer of the service of the user equipment of the first-standard network, a second cell processing unit, configured to establish a second sharing cell of a second-standard network at the shared frequency, and a second service processing unit, configured to establish a service of user equipment of the second-standard network in the second sharing cell, where the first service processing unit is further configured to when the first sharing cell and the second sharing cell share the shared frequency, suspend the data transmission on the data radio bearer of the service of the user equipment of the first-standard network, and retain a common channel of the first sharing cell and a signaling radio bearer of the service of the user equipment of the first-standard network; and the second service processing unit is further configured to: when the first sharing cell and the second sharing cell share the shared frequency, start data transmission on a data radio bearer of the service of the user equipment of the second-standard network.

In a first possible implementation of the second aspect, the apparatus further includes an obtaining unit, configured to obtain load information of a base cell of the second-standard network, and obtain load information of the first sharing cell, and the first service processing unit is further configured to determine, according to the load information of the base cell of the second-standard network and the load information of the first sharing cell, whether the first sharing cell and the second sharing cell share the shared frequency.

With reference to the first possible implementation of the second aspect, in a second possible implementation of the second aspect, the first service processing unit is further configured to: when radio bearer utilization of the base cell of the second-standard network is greater than a first threshold and the load information of the first sharing cell is less than a second threshold, determine that the first sharing cell and the second sharing cell share the shared frequency.

With reference to the second possible implementation of the second aspect, in a third possible implementation of the second aspect, the first service processing unit is further configured to determine, according to the load information of the first sharing cell, duration of the data transmission on the data radio bearer of the service of the user equipment of the second-standard network.

With reference to the third possible implementation of the second aspect, in a fourth possible implementation of the second aspect, the first service processing unit is further configured to determine, according to a proportion of cell transmitted carrier power of the first sharing cell to maximum cell transmit power, the duration of the data transmission on the data radio bearer of the service of the user equipment of the second-standard network, where the duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

With reference to the second possible implementation of the second aspect, in a fifth possible implementation of the second aspect, the second service processing unit is further configured to, when the first sharing cell and the second sharing cell share the shared frequency, use an average value of last N1 channel quality indicator values of the second sharing cell in last sharing as a channel quality indicator value that is in a first time period that is an initial time period in current sharing of the second sharing cell, where N1 is a positive integer.

In a sixth possible implementation of the second aspect, the obtaining unit is further configured to, after the first sharing cell and the second sharing cell share the shared frequency, obtain load information of a base cell of the second-standard network, and obtain load information of the first sharing cell, and the first service processing unit is further configured to determine, according to the load information of the base cell of the second-standard network and the load information of the first sharing cell, whether the first sharing cell and the second sharing cell continue to share the shared frequency.

With reference to the sixth possible implementation of the second aspect, in a seventh possible implementation of the second aspect, the first service processing unit is further configured to, when radio bearer utilization of the base cell of the second-standard network is less than or equal to the first threshold or the load information of the first sharing cell is greater than or equal to the second threshold, determine that the first sharing cell and the second sharing cell do not continue to share the shared frequency.

With reference to the seventh possible implementation of the second aspect, in an eighth possible implementation of the second aspect, the first service processing unit is further configured to, when at least one of the following conditions is met: a quantity of dedicated channel users in the first sharing cell of the first-standard network is greater than or equal to a first sub-threshold, non-high-speed downlink packet access power of the first sharing cell is greater than or equal to a second sub-threshold, and a proportion of cell transmitted carrier power of the first sharing cell to maximum cell transmit power is greater than or equal to a third sub-threshold, determine that the first sharing cell and the second sharing cell do not continue to share the shared frequency.

With reference to the seventh possible implementation of the second aspect, in a ninth possible implementation of the second aspect, the second service processing unit is further configured to, when the first service processing unit determines that the first sharing cell and the second sharing cell do not continue to share the shared frequency, suspend the data transmission on the data radio bearer of the service of the user equipment of the second-standard network, and the first service processing unit is further configured to: when the first service processing unit determines that the first sharing cell and the second sharing cell do not continue to share the shared frequency, start the data transmission on the data radio bearer of the service of the user equipment of the first-standard network, and retain the common channel of the first sharing cell and the signaling radio bearer of the service of the user equipment of the first-standard network.

With reference to the seventh possible implementation of the second aspect, in a tenth possible implementation of the second aspect, the first service processing unit is further configured to: when the first sharing cell and the second sharing cell do not continue to share the shared frequency, use an average value of last N2 channel quality indicator values of the first sharing cell in last non-sharing as a channel quality indicator value that is in a second time period that is an initial time period in current non-sharing of the first sharing cell, where N2 is a positive integer.

With reference to the first possible implementation of the second aspect, in an eleventh possible implementation of the second aspect, the obtaining unit is further configured to, when the load information of the base cell of the second-standard network is greater than the first threshold and the load information of the first sharing cell is greater than or equal to the second threshold, obtain load information of a base cell of the first-standard network; and the first service processing unit is further configured to, when the load information of the base cell of the first-standard network is less than a third threshold, hand over some user equipment in the first sharing cell to the base cell of the first-standard network.

With reference to the eleventh possible implementation of the second aspect, in a twelfth possible implementation of the second aspect, the first service processing unit is further configured to: when the load information of the first sharing cell is less than a fourth threshold and the load information of the base cell of the first-standard network is greater than a fifth threshold, hand over some user equipment in the base cell of the first-standard network to the first sharing cell.

With reference to the eleventh possible implementation of the second aspect or the twelfth possible implementation of the second aspect, in a thirteenth possible implementation of the second aspect, the obtaining unit is further configured to receive a cell establishment message delivered by a radio network controller, and the first cell processing unit is further configured to establish the first sharing cell according to the cell establishment message.

With reference to the thirteenth possible implementation of the second aspect, in a fourteenth possible implementation of the second aspect, the first service processing unit is further configured to adjust at least one of the third threshold, the fourth threshold, and the fifth threshold according to user equipment handover information in the cell establishment message.

According to the embodiments of the present invention, a first base station establishes a first sharing cell at a shared frequency, and starts, in the first sharing cell, data transmission on a data radio bearer of a service of user equipment of a first-standard network; a second base station establishes a second sharing cell at the shared frequency, and establishes a service of user equipment of a second-standard network in the second sharing cell; the first base station suspends the data transmission on the data radio bearer of the service of the user equipment of the first-standard network, and retains a first common channel and a signaling radio bearer of the service of the user equipment of the first-standard network; and the second base station starts data transmission on a data radio bearer of the service of the user equipment of the second-standard network. Therefore, when the first sharing cell and the second sharing cell share the shared frequency, an operation of frequently establishing and deleting a cell does not need to be performed, a KPI of the first sharing cell is not affected, and a spectrum resource is fully used according to a change in a traffic volume between the first-standard network and the second-standard network, so that spectrum resource utilization is improved.

A third aspect provides a base station, where the base station includes a first processor and a first memory that stores an executable instruction of the first processor, where the instruction stored in the first memory is used to enable the first processor to establish a first sharing cell of a first-standard network at a shared frequency, and establish a service of user equipment of the first-standard network in the first sharing cell, and transmit data on a data radio bearer of the service of the user equipment of the first-standard network, and the base station further includes a second processor and a second memory that stores an executable instruction of the second processor, where the instruction stored in the second memory is used to enable the second processor to establish a second sharing cell of a second-standard network at the shared frequency, and establish a service of user equipment of the second-standard network in the second sharing cell. The instruction stored in the first memory is further used to enable the first processor to, when the first sharing cell and the second sharing cell share the shared frequency, suspend the data transmission on the data radio bearer of the service of the user equipment of the first-standard network, and retain a common channel of the first sharing cell and a signaling radio bearer of the service of the user equipment of the first-standard network, and the instruction stored in the second memory is further used to enable the second processor to when the first sharing cell and the second sharing cell share the shared frequency, start data transmission on a data radio bearer of the service of the user equipment of the second-standard network.

In a first possible implementation of the third aspect, the instruction stored in the first memory is further used to enable the first processor to obtain load information of a base cell of the second-standard network, obtain load information of the first sharing cell, and determine, according to the load information of the base cell of the second-standard network and the load information of the first sharing cell, whether the first sharing cell and the second sharing cell share the shared frequency.

With reference to the first possible implementation of the third aspect, in a second possible implementation of the third aspect, that the instruction stored in the first memory is used to enable the first processor to determine, according to the load information of the base cell of the second-standard network and the load information of the first sharing cell, whether the first sharing cell and the second sharing cell share the shared frequency includes the instruction stored in the first memory is used to enable the first processor to, when radio bearer utilization of the base cell of the second-standard network is greater than a first threshold and the load information of the first sharing cell is less than a second threshold, determine that the first sharing cell and the second sharing cell share the shared frequency.

With reference to the second possible implementation of the third aspect, in a third possible implementation of the third aspect, the instruction stored in the first memory is further used to enable the first processor to determine, according to the load information of the first sharing cell, duration of the data transmission on the data radio bearer of the service of the user equipment of the second-standard network.

With reference to the third possible implementation of the third aspect, in a fourth possible implementation of the third aspect, that the instruction stored in the first memory is used to enable the first processor to determine, according to the load information of the first sharing cell, duration of the data transmission on the data radio bearer of the service of the user equipment of the second-standard network includes the instruction stored in the first memory is used to enable the first processor to determine, according to a proportion of cell transmitted carrier power of the first sharing cell to maximum cell transmit power, the duration of the data transmission on the data radio bearer of the service of the user equipment of the second-standard network, where the duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

With reference to the second possible implementation of the third aspect, in a fifth possible implementation of the third aspect, the instruction stored in the second memory is further used to enable the second processor to: when the first sharing cell and the second sharing cell share the shared frequency, use an average value of last N1 channel quality indicator values of the second sharing cell in last sharing as a channel quality indicator value that is in a first time period that is an initial time period in current sharing of the second sharing cell, where N1 is a positive integer.

In a sixth possible implementation of the third aspect, the instruction stored in the first memory is further used to enable the first processor to: after the first sharing cell and the second sharing cell share the shared frequency, obtain load information of the base cell of the second-standard network, obtain load information of the first sharing cell, and determine, according to the load information of the base cell of the second-standard network and the load information of the first sharing cell, whether the first sharing cell and the second sharing cell continue to share the shared frequency.

With reference to the sixth possible implementation of the third aspect, in a seventh possible implementation of the third aspect, that the instruction stored in the first memory is used to enable the first processor to determine, according to the load information of the base cell of the second-standard network and the load information of the first sharing cell, whether the first sharing cell and the second sharing cell continue to share the shared frequency includes: The instruction stored in the first memory is used to enable the first processor to: when radio bearer utilization of the base cell of the second-standard network is less than or equal to the first threshold or the load information of the first sharing cell is greater than or equal to the second threshold, determine that the first sharing cell and the second sharing cell do not continue to share the shared frequency.

With reference to the seventh possible implementation of the third aspect, in an eighth possible implementation of the third aspect, that the instruction stored in the first memory is used to enable the first processor to: when radio bearer utilization of the base cell of the second-standard network is less than or equal to the first threshold or the load information of the first sharing cell is greater than or equal to the second threshold, determine that the first sharing cell and the second sharing cell do not continue to share the shared frequency includes: The instruction stored in the first memory is used to enable the first processor to: when at least one of the following conditions is met, the conditions including a quantity of dedicated channel users in the first sharing cell of the first-standard network is greater than or equal to a first sub-threshold, a non-high-speed downlink packet access power of the first sharing cell is greater than or equal to a second sub-threshold, and a proportion of cell transmitted carrier power of the first sharing cell to maximum cell transmit power is greater than or equal to a third sub-threshold, determine that the first sharing cell and the second sharing cell do not continue to share the shared frequency.

With reference to the seventh possible implementation of the third aspect, in a ninth possible implementation of the third aspect, the instruction stored in the second memory is further used to enable the second processor to, when the first sharing cell and the second sharing cell do not continue to share the shared frequency, suspend the data transmission on the data radio bearer of the service of the user equipment of the second-standard network; and the instruction stored in the first memory is further used to enable the first processor to start the data transmission on the data radio bearer of the service of the user equipment of the first-standard network, and retain the common channel of the first sharing cell and the signaling radio bearer of the service of the user equipment of the first-standard network.

With reference to the seventh possible implementation of the third aspect, in a tenth possible implementation of the third aspect, the instruction stored in the first memory is further used to enable the first processor to, when the first sharing cell and the second sharing cell do not continue to share the shared frequency, use an average value of last N2 channel quality indicator values of the first sharing cell in last non-sharing as a channel quality indicator value that is in a second time period that is an initial time period in current non-sharing of the first sharing cell, where N2 is a positive integer.

With reference to the first possible implementation of the third aspect, in an eleventh possible implementation of the third aspect, the instruction stored in the first memory is further used to enable the first processor to, when the load information of the base cell of the second-standard network is greater than the first threshold and the load information of the first sharing cell is greater than or equal to the second threshold, obtain load information of a base cell of the first-standard network; and when the load information of the base cell of the first-standard network is less than a third threshold, hand over some user equipment in the first sharing cell to the base cell of the first-standard network.

With reference to the eleventh possible implementation of the third aspect, in a twelfth possible implementation of the third aspect, the instruction stored in the first memory is further used to enable the first processor to, when the load information of the first sharing cell is less than a fourth threshold and the load information of the base cell of the first-standard network is greater than a fifth threshold, hand over some user equipment in the base cell of the first-standard network to the first sharing cell.

With reference to the eleventh possible implementation of the third aspect, or the twelfth possible implementation of the third aspect, in a thirteenth possible implementation of the third aspect, the instruction stored in the first memory is further used to enable the first processor to: receive a cell establishment message delivered by a radio network controller; and establish the first sharing cell according to the cell establishment message.

With reference to the thirteenth possible implementation of the third aspect, in a fourteenth possible implementation of the third aspect, the instruction stored in the first memory is further used to enable the first processor to adjust at least one of the third threshold, the fourth threshold, and the fifth threshold according to user equipment handover information in the cell establishment message.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
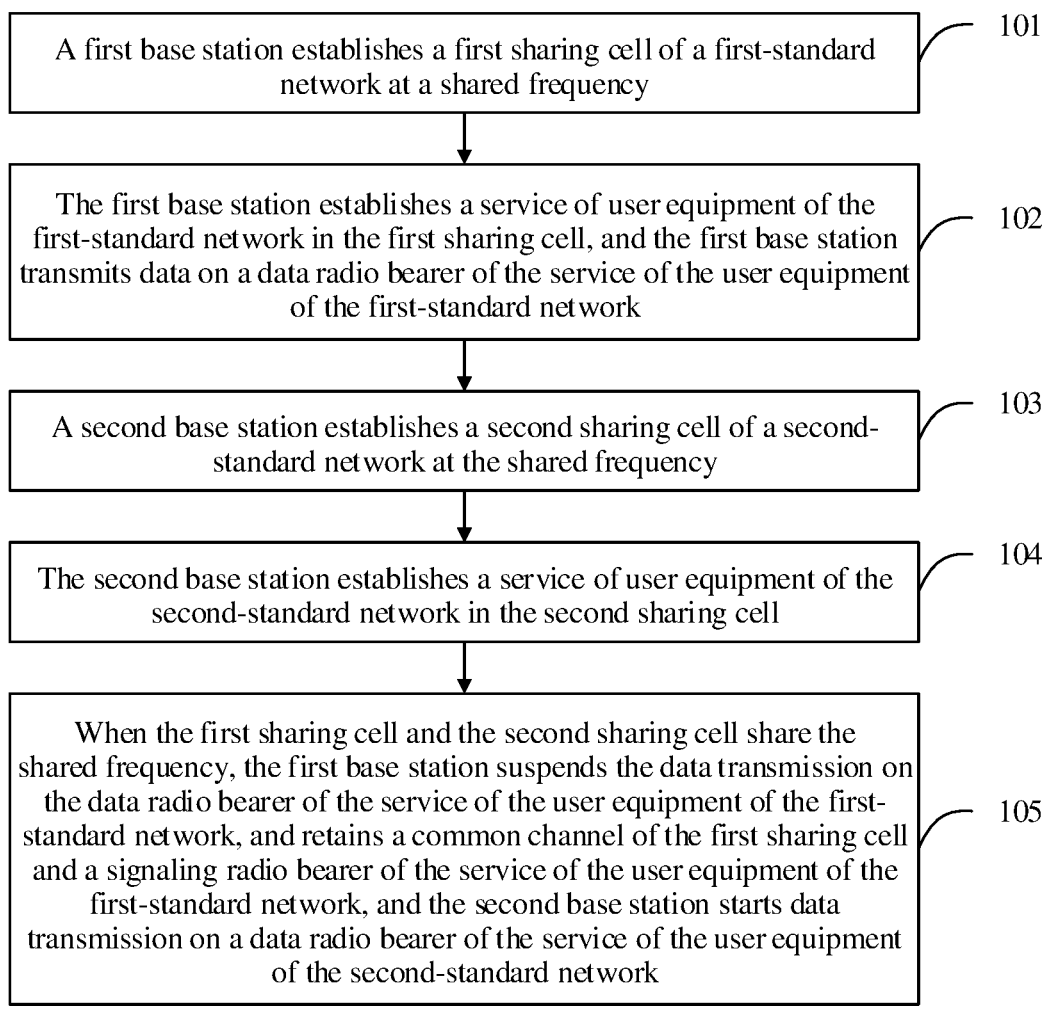
FIG. 1 is a flowchart of a spectrum sharing method according to a first embodiment of the present invention.

FIG. 1 is a flowchart of a spectrum sharing method according to a first embodiment of the present invention. As shown in FIG. 1, the spectrum sharing method in this embodiment includes the following steps.

S101. A first base station establishes a first sharing cell of a first-standard network at a shared frequency.

Optionally, a common channel (CCH) of the first sharing cell is a first common channel.

S102. The first base station establishes a service of user equipment (UE) of the first-standard network in the first sharing cell, and the first base station transmits data on a data radio bearer (TRB) of the service of the user equipment of the first-standard network.

S103. A second base station establishes a second sharing cell of a second-standard network at the shared frequency.

Optionally, a common channel of the second sharing cell is a second common channel.

S104. The second base station establishes a service of user equipment of the second-standard network in the second sharing cell.

Optionally, the first-standard network is a UMTS network, and the second-standard network is an LTE network, or the first-standard network is an LTE network, and the second-standard network is a UMTS network. Alternatively, the first-standard network is an LTE network, and the second-standard network is a 5G network; or the first-standard network is a 5G network, and the second-standard network is an LTE network. Alternatively, the first-standard network is a 2G network, and the second-standard network is a 3G network; or the first-standard network is a 3G network, and the second-standard network is a 2G network. In addition, alternatively, the first-standard network is a 3G network, and the second-standard network is a 5G network, or the first-standard network is a 5G network, and the second-standard network is a 3G network. It may be understood that the first-standard network and the second-standard network may be two networks of different standards among networks that are in the prior art or that may occur in the future. This is not limited in this embodiment herein.

Optionally, the second-standard network may include a base cell. The first base station may further obtain load information of the base cell of the second-standard network, and obtain load information of the first sharing cell. The first base station may further determine, according to the load information of the base cell of the second-standard network and the load information of the first sharing cell, whether the first sharing cell and the second sharing cell share the shared frequency.

Optionally, the base cell of the second-standard network may be established by a third base station.

Optionally, the load information of the base cell of the second-standard network may include radio bearer utilization. When the radio bearer utilization of the base cell of the second-standard network is greater than a first threshold and the load information of the first sharing cell is less than a second threshold, the first base station determines that the first sharing cell and the second sharing cell share the shared frequency.

S105. When the first sharing cell and the second sharing cell share the shared frequency, the first base station suspends the data transmission on the data radio bearer of the service of the user equipment of the first-standard network, and retains a common channel of the first sharing cell and a signaling radio bearer (SRB) of the service of the user equipment of the first-standard network, and the second base station starts data transmission on a data radio bearer of the service of the user equipment of the second-standard network.

Optionally, when the first sharing cell and the second sharing cell share the shared frequency, both the base cell of the second-standard network and the second sharing cell serve UE covered by the second-standard network. When the first sharing cell and the second sharing cell do not share the shared frequency, the base cell of the second-standard network serves UE covered by the second-standard network.

Optionally, the base cell of the second-standard network and the second sharing cell serve, by means of carrier aggregation (CA), UE covered by the second-standard network. The base cell of the second-standard network may ensure a process of downlink signaling transmission, synchronization or out-of-synchronization detection, or the like of the user equipment of the second-standard network. Therefore, when the first sharing cell and the second sharing cell share the shared frequency, a key performance indicator KPI) of the second sharing cell is not affected.

Optionally, the first base station may further determine, according to the load information of the first sharing cell, duration of the data transmission on the data radio bearer of the service of the user equipment of the second-standard network.

Optionally, the load information of the first sharing cell includes a proportion of cell transmitted carrier power to maximum cell transmit power. The first base station may further determine, according to the proportion of the cell transmitted carrier power to the maximum cell transmit power, the duration of the data transmission on the data radio bearer of the service of the user equipment of the second-standard network. The duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

Optionally, when the first sharing cell and the second sharing cell share the shared frequency, the second base station may further use an average value of last N1 channel quality indicator (CQI) values of the second sharing cell in last sharing as a channel quality indicator value that is in a first time period that is an initial time period in current sharing of the second sharing cell. N1 is a positive integer. Therefore, a co-channel interference signal of the first-standard network does not affect the user equipment of the second-standard network.

Optionally, after the first sharing cell and the second sharing cell share the shared frequency, the first base station may further obtain load information of a base cell of the second-standard network, and obtain load information of the first sharing cell. The first base station may further determine, according to the load information of the base cell of the second-standard network and the load information of the first sharing cell, whether the first sharing cell and the second sharing cell continue to share the shared frequency.

Optionally, when radio bearer utilization of the base cell of the second-standard network is less than or equal to a first threshold or the load information of the first sharing cell is greater than or equal to a second threshold, the first base station may further determine that the first sharing cell and the second sharing cell do not continue to share the shared frequency.

Optionally, the load information of the first sharing cell may include at least one of the following: a quantity of dedicated channel users of the first-standard network, non-high-speed downlink packet access power, and a proportion of cell transmitted carrier power to maximum cell transmit power. The second threshold may include a first sub-threshold, a second sub-threshold, a third sub-threshold, or the like. When at least one of the following is met: the quantity of dedicated channel users in the first sharing cell of the first-standard network is greater than or equal to the first sub-threshold, the non-high-speed downlink packet access power of the first sharing cell is greater than or equal to the second sub-threshold, and the proportion of the cell transmitted carrier power of the first sharing cell to the maximum cell transmit power is greater than or equal to the third sub-threshold, the first base station determines that the first sharing cell and the second sharing cell do not continue to share the shared frequency.

Optionally, when the first base station determines that the first sharing cell and the second sharing cell do not continue to share the shared frequency, the second base station may further suspend the data transmission on the data radio bearer of the service of the user equipment of the second-standard network. The first base station may further start the data transmission on the data radio bearer of the service of the user equipment of the first-standard network, and retain the first common channel and the signaling radio bearer of the service of the user equipment of the first-standard network.

Optionally, when the first sharing cell and the second sharing cell do not continue to share the shared frequency, the first base station may further use an average value of last N2 channel quality indicator values of the first sharing cell in last non-sharing as a channel quality indicator value that is in a second time period that is an initial time period in current non-sharing of the first sharing cell. N2 is a positive integer. Therefore, a co-channel interference signal of the second-standard network does not affect the user equipment of the first-standard network.

Optionally, the first-standard network may further include a base cell. When the load information of the base cell of the second-standard network is greater than a first threshold and the load information of the first sharing cell is greater than or equal to a second threshold, the first base station may further obtain load information of the base cell of the first-standard network. When the load information of the base cell of the first-standard network is less than a third threshold, the first base station may further hand over some user equipment in the first sharing cell to the base cell of the first-standard network. Therefore, it is easier for a condition of the first sharing cell, such as a quantity of remaining dedicated channel users of the first-standard network, the non-high-speed downlink packet access power, or the proportion of the cell transmitted carrier power to the maximum cell transmit power, to meet a trigger condition for sharing the shared frequency by the first sharing cell and the second sharing cell.

Optionally, when the first sharing cell and the second sharing cell do not share the shared frequency, both the base cell of the first-standard network and the first sharing cell serve UE covered by the first-standard network. When the first sharing cell and the second sharing cell share the shared frequency, the base cell of the first-standard network serves UE covered by the first-standard network.

Optionally, the base cell of the first-standard network and the first sharing cell serve, by means of carrier aggregation, UE covered by the first-standard network.

Optionally, the base cell of the first-standard network may be established by a fourth base station.

Optionally, when the load information of the first sharing cell is less than a fourth threshold and the load information of the base cell of the first-standard network is greater than a fifth threshold, the first base station may further hand over some user equipment in the base cell of the first-standard network to the first sharing cell.

Optionally, when a traffic volume of specific user equipment in the first sharing cell is less than a sixth threshold, the first base station may hand over the user equipment to the base cell of the first-standard network.

Optionally, before the first base station establishes the first sharing cell, the first base station may further receive a cell establishment message delivered by a radio network controller (RNC), and establish the first sharing cell according to the cell establishment message.

Optionally, the cell establishment message may include identification information of the first sharing cell, to identify a to-be-established cell as the first sharing cell. The first base station determines the to-be-established cell as the first sharing cell according to the identification information.

Optionally, the cell establishment message may further include user equipment handover information that is used to adjust at least one of the third threshold, the fourth threshold, the fifth threshold, and the sixth threshold, so that it is easier for user equipment on an edge of the first sharing cell to trigger inter-frequency handover or inter-RAT handover, and it is relatively difficult for user equipment of inter-frequency or inter-RAT to be handed over to the first sharing cell.

Optionally, the cell establishment message may further include cell status setting information that is used to set a status of the first sharing cell to a forbidden state, so that idle-state user equipment is not allowed to enter the first sharing cell.

Optionally, the cell establishment message may further include intra-frequency measurement configuration information that is used to use received signal code power as a measurement quantity in intra-frequency measurement.

In this embodiment of the present invention, a user equipment handover manner may include at least one of blind handover and measurement-based handover. The blind handover is handover triggered by another algorithm module (for example, load control) without user equipment measurement, and the measurement-based handover is handover triggered by means of user measurement.

Optionally, in an uplink direction of the first sharing cell, the first base station retains the first common channel, the signaling radio bearer of the service of the user equipment in the first sharing cell, and the data radio bearer of the service of the user equipment in the first sharing cell. Therefore, the user equipment of the first-standard network may feed back information such as an acknowledgement (ACK), a non-acknowledgement (NACK), or a CQI of a high speed downlink packet access (HSDPA) data channel on an uplink high speed dedicated physical control channel (HS-DPCCH) at any time, so that when the first sharing cell and the second sharing cell do not share the shared frequency, both the first sharing cell and the second sharing cell can perform high speed downlink packet access scheduling. In addition, the user equipment of the second-standard network does not cause uplink co-channel interference to the first-standard network.

Optionally, when the first sharing cell and the second sharing cell share the shared frequency, the first base station suspends, in the uplink direction of the first sharing cell, the data transmission on the data radio bearer of the service of the user equipment of the first-standard network, and retains the first common channel and the signaling radio bearer of the service of the user equipment of the first-standard network, and the second base station starts, in an uplink direction of the second sharing cell, the data transmission on the data radio bearer of the service of the user equipment of the second-standard network.

Optionally, when the first sharing cell and the second sharing cell share the shared frequency, the first base station suspends, in a downlink direction of the first sharing cell, the data transmission on the data radio bearer of the service of the user equipment of the first-standard network, and retains the first common channel and the signaling radio bearer of the service of the user equipment of the first-standard network, and the second base station starts, in a downlink direction of the second sharing cell, the data transmission on the data radio bearer of the service of the user equipment of the second-standard network. Therefore, when the first sharing cell and the second sharing cell share the shared frequency, the first common channel and transmission of the signaling radio bearer of the service of the user equipment of the first-standard network are not interrupted, so that a KPI of the first sharing cell is not affected.

Optionally, the data radio bearer of the service of the user equipment of the first-standard network may be carried on the high speed downlink packet access data channel. The first common channel may include a common pilot channel, so that synchronization of a downlink radio link between existing user equipment in the first sharing cell and the first base station can be retained, so as to reduce call drop.

Optionally, the signaling radio bearer of the service of the user equipment of the first-standard network may be carried on a dedicated physical data channel (DPDCH) and a dedicated physical control channel (DPCCH). The user equipment in the first sharing cell may transmit various types of SRB signaling at any time, so that a call drop rate, a handover success rate, an access success rate, and the like of the first sharing cell are not affected.

Optionally, the first common channel may further include a synchronization channel, so that when user equipment in another cell of the first-standard network is handed over to the first sharing cell, initial synchronization of the user equipment can be ensured.

Optionally, the first common channel may further include a broadcast channel, so that when user equipment in another cell of the first-standard network is handed over to the first sharing cell, the user equipment can read a system frame number (SFN) on the broadcast channel of the first sharing cell, so as to complete an entire handover process.

Optionally, a proportion of pilot power of the first sharing cell to maximum transmit power of the entire cell is less than a specific proportion, for example, less than 5%. A quantity of high speed downlink packet access users in the first sharing cell is less than a specific quantity, for example, less than 20. Therefore, the first common channel and the signaling radio bearer of the service of the user equipment of the first-standard network do not cause much interference to the second-standard network.

Optionally, the first sharing cell may be one or more first sharing cells established by the first base station.

Optionally, the base cell of the second-standard network and the second sharing cell may be co-sector cells.

Optionally, when the first sharing cell is one first sharing cell established by the first base station, the load information of the first sharing cell is load information of the one first sharing cell. The base cell of the second-standard network is a group of base cells of the second-standard network that are in a same sector as the one first sharing cell. The load information of the base cell of the second-standard network is average load information of the group of base cells of the second-standard network.

Optionally, when the first sharing cell is multiple first sharing cells established by the first base station, the load information of the first sharing cell is average load information of the multiple first sharing cells. The base cell of the second-standard network is multiple groups of base cells of the second-standard network that are separately in same sectors as the multiple first sharing cells. The load information of the base cell of the second-standard network is average load information of the multiple groups of base cells of the second-standard network.

Optionally, the first sharing cell and the second sharing cell may be co-sector cells.

Optionally, the first base station and the second base station may be co-site base stations. The first base station and the second base station may share a clock source. Therefore, the first sharing cell may be aligned and synchronized with the second sharing cell in terms of time. When the first sharing cell and the second sharing cell do not share the shared frequency, the first base station serves UE covered by the first-standard network. When the first sharing cell and the second sharing cell share the shared frequency, the second base station serves UE covered by the second-standard network.

It may be learned from the foregoing description that, according to the spectrum sharing method provided in this embodiment, a first base station establishes a first sharing cell at a shared frequency, and starts, in the first sharing cell, data transmission on a data radio bearer of a service of user equipment of a first-standard network; a second base station establishes a second sharing cell at the shared frequency, and establishes a service of user equipment of a second-standard network in the second sharing cell; the first base station suspends the data transmission on the data radio bearer of the service of the user equipment of the first-standard network, and retains a first common channel and a signaling radio bearer of the service of the user equipment of the first-standard network; and the second base station starts data transmission on a data radio bearer of the service of the user equipment of the second-standard network. Therefore, when the first sharing cell and the second sharing cell share the shared frequency, an operation of frequently establishing and deleting a cell does not need to be performed, a KPI of the first sharing cell is not affected, and a spectrum resource is fully used according to a change in a traffic volume between the first-standard network and the second-standard network, so that spectrum resource utilization is improved.

Figure 2:
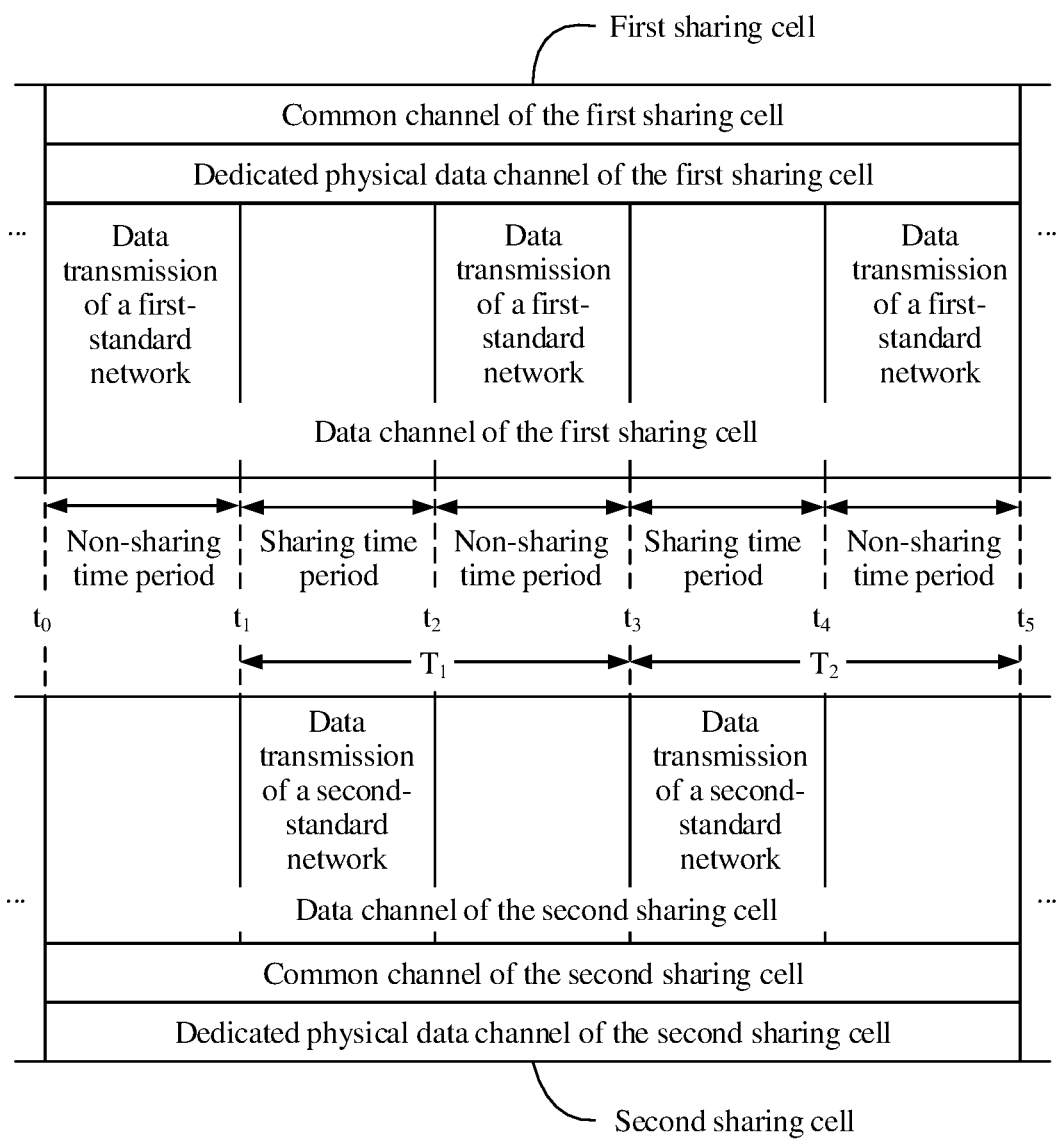
FIG. 2 is a schematic diagram of a spectrum sharing method according to a second embodiment of the present invention.

FIG. 2 is a schematic diagram of a spectrum sharing method according to a second embodiment of the present invention. On the basis of the first embodiment, the spectrum sharing method in the first embodiment is further explained in the second embodiment. As shown in FIG. 2, a common channel of a first sharing cell is a first common channel. In the first sharing cell, a signaling radio bearer of a service of user equipment of a first-standard network is carried on a dedicated physical data channel of the first sharing cell, and a data radio bearer of the service of the user equipment of the first-standard network is carried on a data channel of the first sharing cell. In a second sharing cell, a second base station does not transmit a message on a common channel of the second sharing cell, and the second base station does not transmit signaling on a signaling radio bearer carried on a dedicated physical data channel of the second sharing cell. A data radio bearer of a service of user equipment of a second-standard network is carried on a data channel of the second sharing cell. A base cell of the second-standard network ensures work of the common channel and the dedicated physical data channel of the second sharing cell. In FIG. 2, data transmission of the first-standard network indicates data transmission on the data radio bearer of the service of the user equipment of the first-standard network, and data transmission of the second-standard network indicates data transmission on the data radio bearer of the service of the user equipment of the second-standard network. When a sharing state of a shared frequency changes, the data transmission on the data channel of the first sharing cell and the data channel of the second sharing cell changes accordingly. When the first sharing cell and the second sharing cell do not share the shared frequency, that is, the shared frequency is in a non-sharing time period, the second base station suspends, in the second sharing cell, the data transmission on the data radio bearer of the service of the user equipment of the second-standard network, and the first base station starts, in the first sharing cell, the data transmission on the data radio bearer of the service of the user equipment of the first-standard network, and retains the first common channel and the signaling radio bearer of the service of the user equipment of the first-standard network. When the first sharing cell and the second sharing cell share the shared frequency, that is, the shared frequency is in a sharing time period, the first base station suspends, in the first sharing cell, the data transmission on the data radio bearer of the service of the user equipment of the first-standard network, and retains the first common channel and the signaling radio bearer of the service of the user equipment of the first-standard network, and the second base station starts, in the second sharing cell, the data transmission on the data radio bearer of the service of the user equipment of the second-standard network.

Optionally, the first base station establishes the first sharing cell of the first-standard network at the shared frequency at a moment $t_0$. The second base station establishes the second sharing cell of the second-standard network at the shared frequency at the moment $t_0$. From the moment $t_0$ to a moment $t_1$, the shared frequency is in a non-sharing time period. After the first base station establishes the first sharing cell, and the second base station establishes the second sharing cell, the first base station periodically performs sharing determining according to load information of the base cell of the second-standard network and load information of the first sharing cell. For example, the first base station performs sharing determining for the first time before the moment $t_1$. In a period $T_1$ (from the moment $t_1$ to a moment $t_3$), the first base station determines that the first sharing cell and the second sharing cell start to share the shared frequency at the moment $t_1$, and a time period from the moment $t_1$ to a moment $t_2$ is a sharing time period of the shared frequency. Before the period $T_1$ ends, the first base station performs sharing determining for the second time before the moment $t_3$. Specific implementation content is the same as that in the first time of sharing determining. Before a period $T_2$ ends, the first base station performs sharing determining for the third time before a moment $t_5$. Specific implementation content is the same as that in the first time of sharing determining, and so on. Specifically, a time period from the moment $t_0$ to the moment $t_1$ is a first non-sharing time period of the shared frequency, a time period from the moment $t_1$ to the moment $t_2$ is a first sharing time period of the shared frequency, a time period from the moment $t_2$ to the moment $t_3$ is a second non-sharing time period of the shared frequency, a time period from the moment $t_3$ to a moment $t_4$ is a second sharing time period of the shared frequency, and a time period from the moment $t_4$ to the moment $t_5$ is a third non-sharing time period of the shared frequency, and so on. When the shared frequency is in the second non-sharing time period, the second time of non-sharing is referred to as current non-sharing, and the first time of non-sharing is referred to as last non-sharing relative to the second time of non-sharing; when the shared frequency is in the third non-sharing time period, the third time of non-sharing is referred to as current non-sharing, and the second time of non-sharing is referred to as last non-sharing relative to the third time of non-sharing; and so on. Similarly, when the shared frequency is in the second sharing time period, the second time of sharing is referred to as current sharing, and the first time of sharing is referred to as last sharing relative to the second time of sharing; and so on.

Optionally, a time proportion of a sharing time period to each period is determined by the first base station according to the load information of the first sharing cell. Specifically, the time proportion of the sharing time period to each period varies with the load information of the first sharing cell. When a load of the first sharing cell is reduced, a time proportion of the sharing time period to the period $T_1$ is increased, or when a load of the first sharing cell is increased, a time proportion of the sharing time period to the period $T_1$ is decreased, or even may be zero. That is, the first sharing cell and the second sharing cell may not share the shared frequency in a specific period.

In this embodiment, a first base station determines, by determining a sharing state of a shared frequency, that data transmission performed at a current frequency is data transmission on a data radio bearer of a service of user equipment of a first-standard network or data transmission on a data radio bearer of a service of user equipment of a second-standard network, and further determines a time proportion of a sharing time period to each period according to load information of a first sharing cell, that is, a time proportion of duration of the data transmission on the data radio bearer of the service of the user equipment of the second-standard network to each period. An idle traffic time period of the first sharing cell can be fully used according to different load statuses of the first sharing cell in different time periods, to transmit data on the data radio bearer of the service of the user equipment of the second-standard network, so that spectrum resource utilization is improved.

Figure 3A:
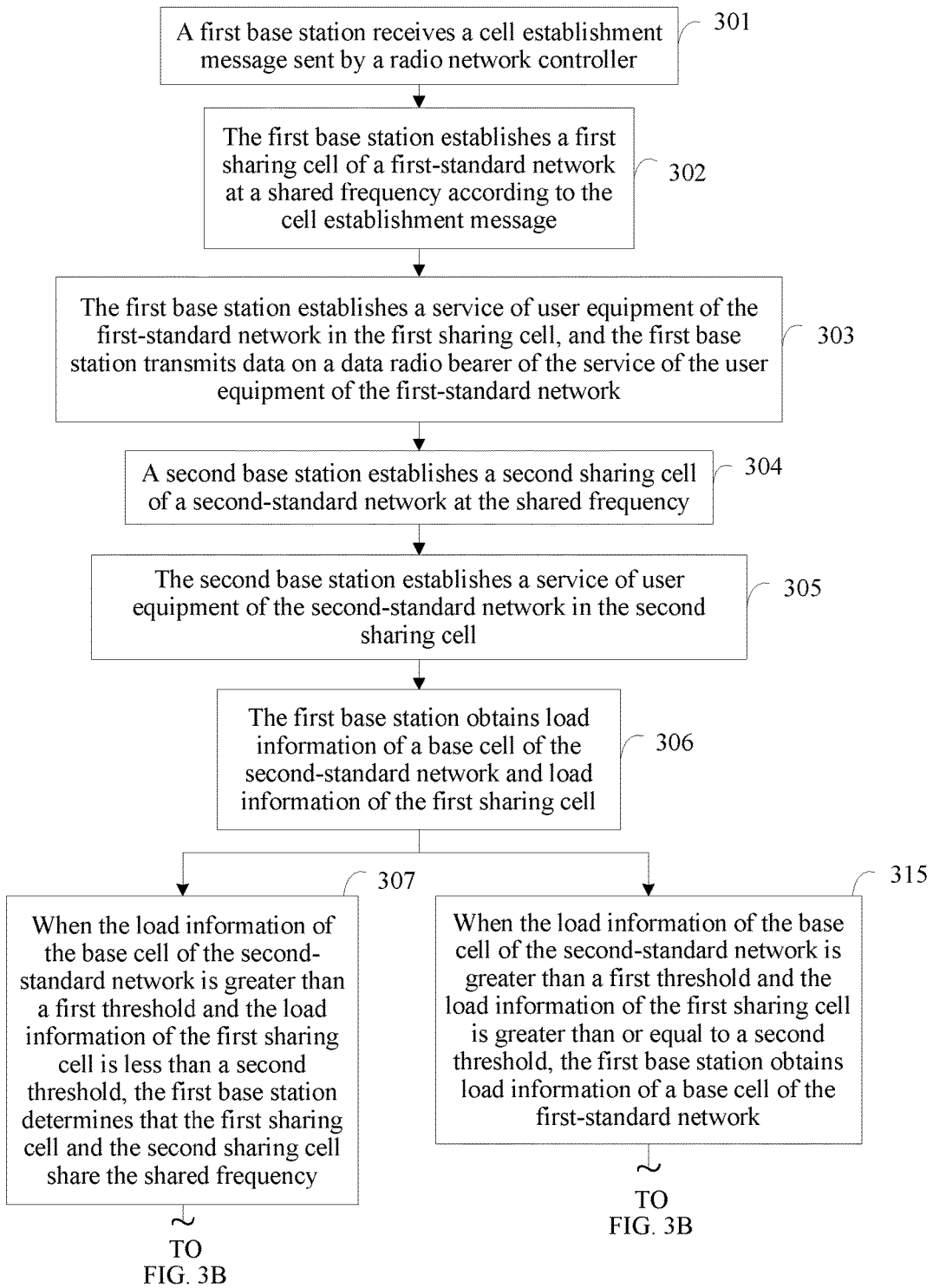
FIG. 3A, FIG. 3B, and FIG. 3C are a flowchart of a spectrum sharing method according to a third embodiment of the present invention.
Figure 3B:
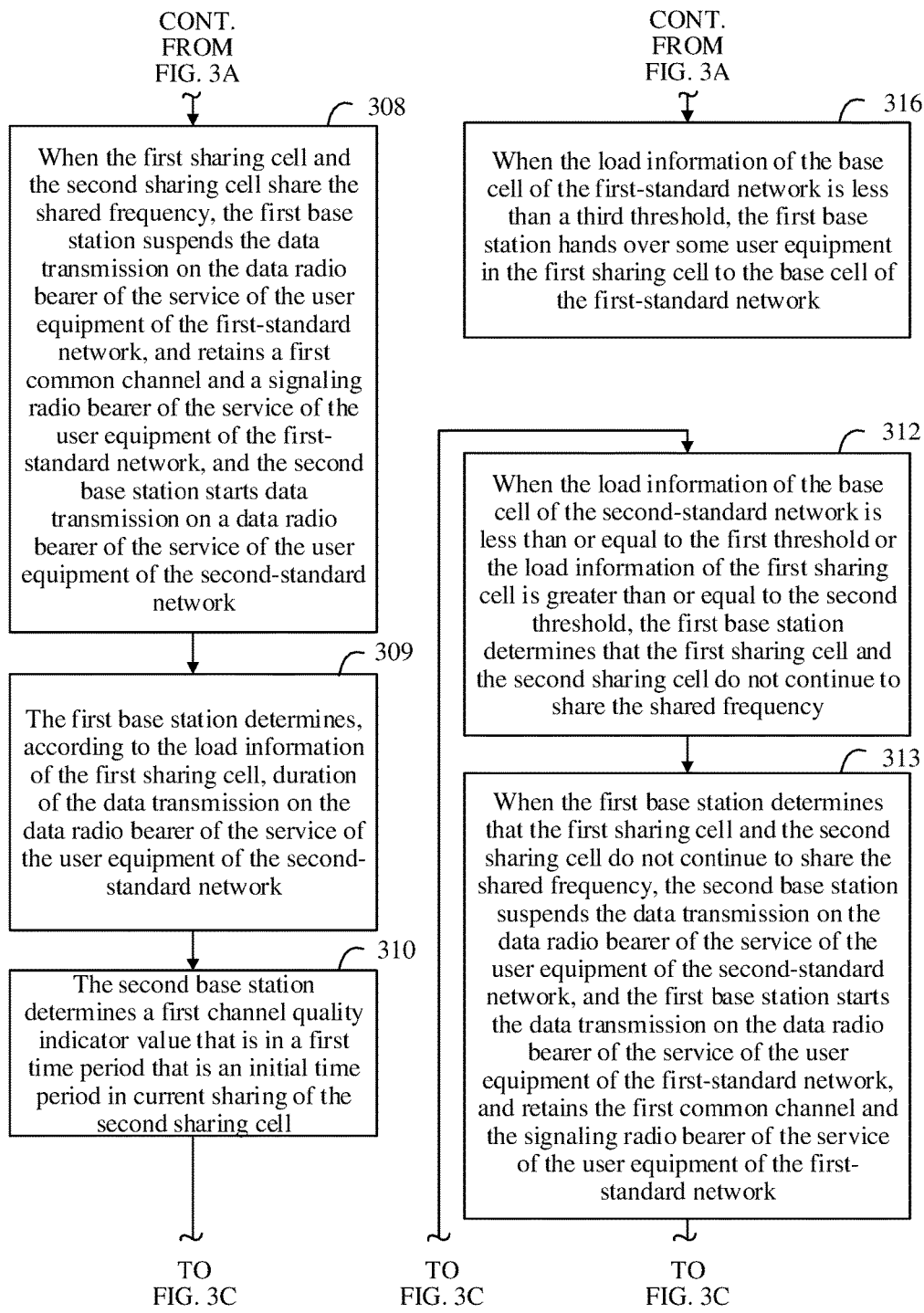
Figure 3C:
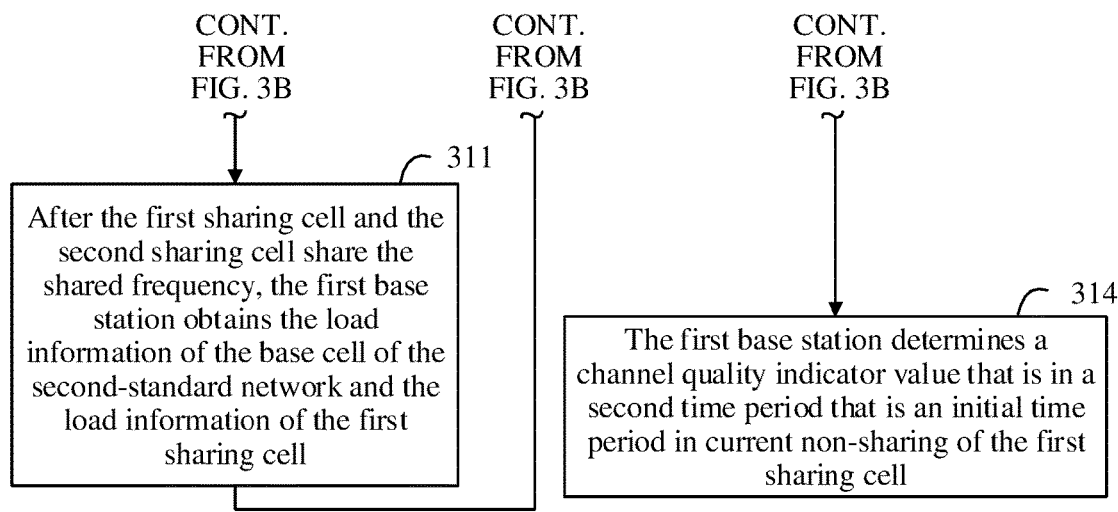

To further describe this embodiment of the present invention in detail, a third embodiment of the present invention provides a spectrum sharing method. In this embodiment, for content that is the same as that in the first and second embodiments, refer to detailed descriptions in the first and second embodiments. This is not described herein again. FIG. 3A, FIG. 3B, and FIG. 3C are a flowchart of a spectrum sharing method according to a third embodiment of the present invention. As shown in FIG. 3A and FIG. 3B, the spectrum sharing method in this embodiment includes the following steps.

S301. A first base station receives a cell establishment message sent by a radio network controller.

S302. The first base station establishes a first sharing cell of a first-standard network at a shared frequency according to the cell establishment message.

S303. The first base station establishes a service of user equipment of the first-standard network in the first sharing cell, and the first base station transmits data on a data radio bearer of the service of the user equipment of the first-standard network.

S304. A second base station establishes a second sharing cell of a second-standard network at the shared frequency.

S305. The second base station establishes a service of user equipment of the second-standard network in the second sharing cell.

S306. The first base station obtains load information of a base cell of the second-standard network and load information of the first sharing cell, where when the load information of the base cell of the second-standard network is greater than a first threshold and the load information of the first sharing cell is less than a second threshold, S307 is performed, or when the load information of the base cell of the second-standard network is greater than a first threshold and the load information of the first sharing cell is greater than or equal to a second threshold, S315 is performed.

S307. When the load information of the base cell of the second-standard network is greater than the first threshold and the load information of the first sharing cell is less than the second threshold, the first base station determines that the first sharing cell and the second sharing cell share the shared frequency.

S308. When the first sharing cell and the second sharing cell share the shared frequency, the first base station suspends the data transmission on the data radio bearer of the service of the user equipment of the first-standard network, and retains a first common channel and a signaling radio bearer of the service of the user equipment of the first-standard network, and the second base station starts data transmission on a data radio bearer of the service of the user equipment of the second-standard network.

S309. The first base station determines, according to the load information of the first sharing cell, duration of the data transmission on the data radio bearer of the service of the user equipment of the second-standard network.

S310. The second base station determines a channel quality indicator value that is in a first time period that is an initial time period in current sharing of the second sharing cell.

Optionally, when the current sharing is not the first time of sharing, the second base station may use an average value of last N1 channel quality indicator values of the second sharing cell in last sharing as the channel quality indicator value that is in a first time period that is an initial time period in current sharing of the second sharing cell. N1 is a positive integer.

S311. After the first sharing cell and the second sharing cell share the shared frequency, the first base station obtains the load information of the base cell of the second-standard network and the load information of the first sharing cell.

S312. When the load information of the base cell of the second-standard network is less than or equal to the first threshold or the load information of the first sharing cell is greater than or equal to the second threshold, the first base station determines that the first sharing cell and the second sharing cell do not continue to share the shared frequency.

S313. When the first base station determines that the first sharing cell and the second sharing cell do not continue to share the shared frequency, the second base station suspends the data transmission on the data radio bearer of the service of the user equipment of the second-standard network, and the first base station starts the data transmission on the data radio bearer of the service of the user equipment of the first-standard network, and retains the first common channel and the signaling radio bearer of the service of the user equipment of the first-standard network.

S314. The first base station determines a channel quality indicator value that is in a second time period that is an initial time period in current non-sharing of the first sharing cell.

Optionally, when the first sharing cell and the second sharing cell do not continue to share the shared frequency, if the current non-sharing is not the first time of non-sharing, the first base station may use an average value of last N2 channel quality indicator values of the first sharing cell in last non-sharing as the channel quality indicator value that is in a second time period that is an initial time period in current non-sharing of the first sharing cell. N2 is a positive integer.

S315. When the load information of the base cell of the second-standard network is greater than the first threshold and the load information of the first sharing cell is greater than or equal to the second threshold, the first base station obtains load information of a base cell of the first-standard network.

S316. When the load information of the base cell of the first-standard network is less than a third threshold, the first base station hands over some user equipment in the first sharing cell to the base cell of the first-standard network.

In this embodiment, some users in the first sharing cell are handed over to the base cell of the first-standard network, so that a load of the first sharing cell can be reduced, and it is easier for the first sharing cell to meet a sharing condition.

In this embodiment, a first base station can flexibly adjust a sharing state of a shared frequency according to a change in a load status of a base cell of a second-standard network and a load status of a first sharing cell, and can adjust a load amount of the first sharing cell according to a change in the load status of the first sharing cell and a load status of a base cell of a first-standard network, so that it is easier for the first sharing cell to meet a sharing condition for the first sharing cell and a second sharing cell. Therefore, an idle traffic time period of the first sharing cell is fully used for data transmission of the second-standard network, and spectrum resource utilization is improved.

For a specific method in this embodiment of the present invention for determining, by the first base station after obtaining the load information of the base cell of the second-standard network and the load information of the first sharing cell, whether the first sharing cell and the second sharing cell share the shared frequency and how the first sharing cell and the second sharing cell share the shared frequency, a UMTS network and an LTE network are used as a specific scenario in a fourth embodiment of the present invention, to provide a spectrum sharing method. The first sharing cell is a sharing cell of the UMTS network, and the second sharing cell is a sharing cell of the LTE network. In this embodiment, for content that is the same as that in the first, second, and third embodiments, refer to detailed descriptions in the first, second, and third embodiments. This is not described herein again.

Optionally, the first sharing cell may be a sharing cell that is of the UMTS network and that is established by the first base station. The second sharing cell may be a sharing cell that is of the LTE network and that is in a same sector as the sharing cell of the UMTS network. The base cell of the second-standard network may be a group of base cells that are of the LTE network and that are in same sectors as the sharing cell of the UMTS network. Optionally, alternatively, the first sharing cell may be multiple sharing cells that are of the UMTS network and that are established by the first base station. The base cell of the second-standard network may be multiple groups of base cells that are of the LTE network and that are separately in same sectors as the multiple sharing cells of the UMTS network. In this case, for the spectrum sharing method, refer to the following detailed description in this embodiment. This is not described herein.

Figure 4A:
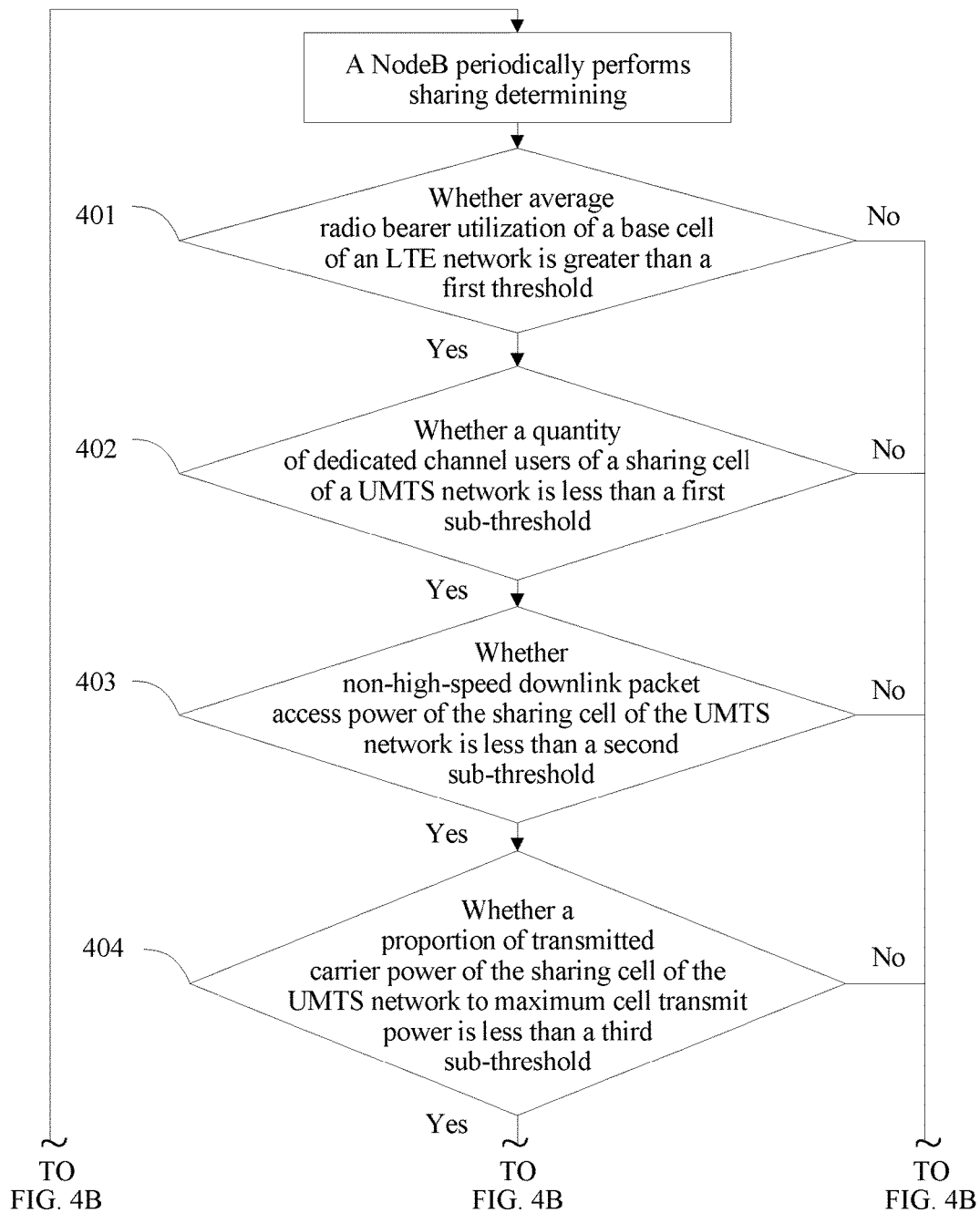
FIG. 4A and FIG. 4B are a flowchart of a spectrum sharing method according to a fourth embodiment of the present invention.
Figure 4B:
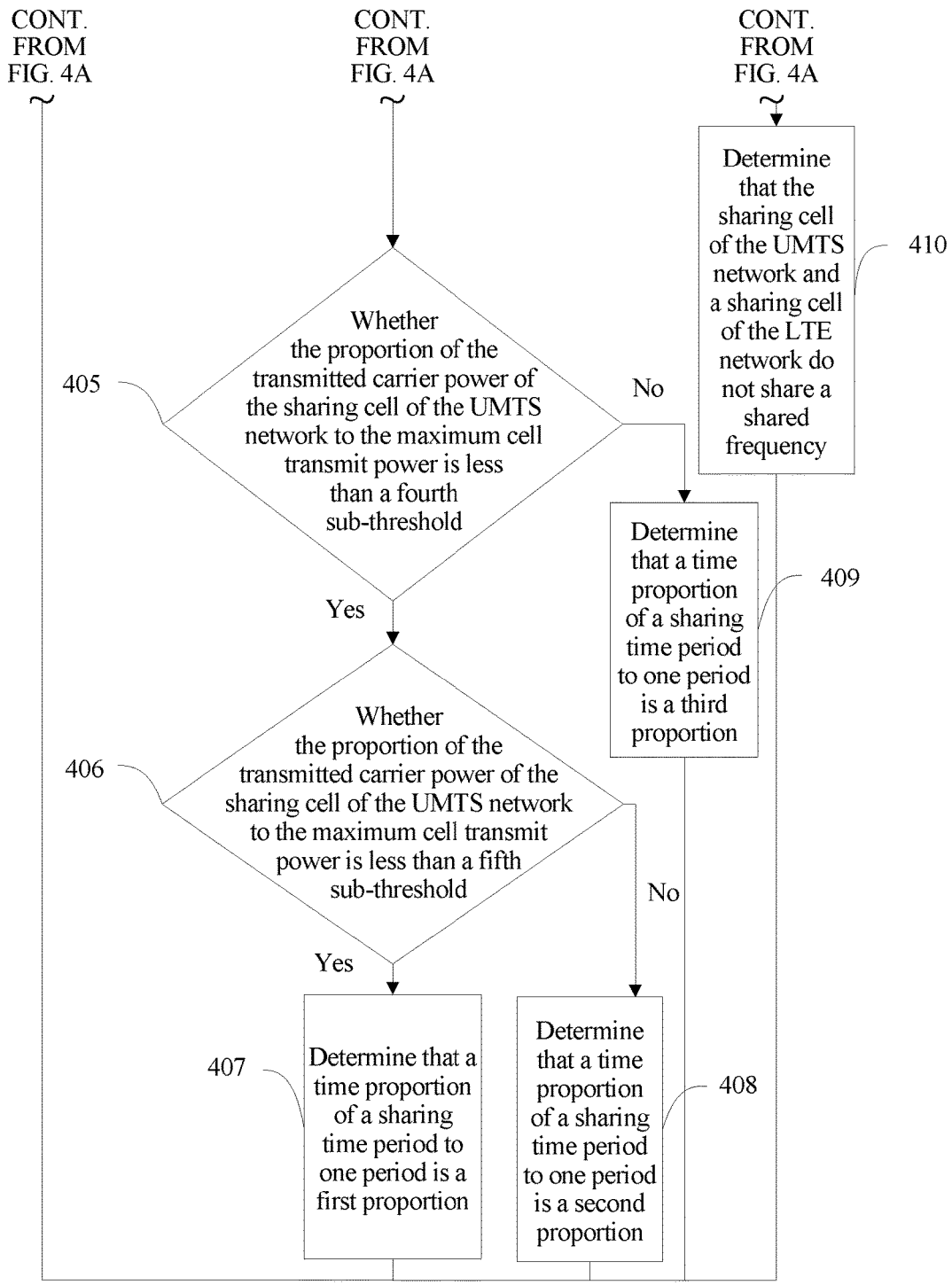

Optionally, the first base station may be a NodeB, and the second base station may be an eNodeB. The NodeB may periodically obtain load information of a base cell of the LTE network and load information of the sharing cell of the UMTS network, and save the two pieces of information in a global variable. The NodeB may perform periodical sharing determining according to the stored load information of the base cell of the LTE network and load information of the sharing cell of the UMTS network. FIG. 4A and FIG. 4B are a flowchart of a spectrum sharing method according to a fourth embodiment of the present invention.

As shown in FIG. 4A and FIG. 4B, the spectrum sharing method in this embodiment includes the following steps.

S401. A NodeB determines whether average radio bearer utilization of a base cell of an LTE network is greater than a first threshold.

When the average radio bearer utilization of the base cell of the LTE network is greater than the first threshold, S402 is performed, or otherwise, S410 is performed.

S402. The NodeB determines whether a quantity of dedicated channel users of a sharing cell of a UMTS network is less than a first sub-threshold.

When the quantity of dedicated channel users of the sharing cell of the UMTS network is less than the first sub-threshold, S403 is performed, or otherwise, S410 is performed.

S403. The NodeB determines whether non-high-speed downlink packet access power of the sharing cell of the UMTS network is less than a second sub-threshold.

When the non-high-speed downlink packet access power of the sharing cell of the UMTS network is less than the second sub-threshold, S404 is performed, or otherwise, S410 is performed.

S404. The NodeB determines whether a proportion of transmitted carrier power of the sharing cell of the UMTS network to maximum cell transmit power is less than a third sub-threshold.

When the proportion of the transmitted carrier power of the sharing cell of the UMTS network to the maximum cell transmit power is less than the third sub-threshold, S405 is performed, or otherwise, S410 is performed.

S405. The NodeB determines whether the proportion of the transmitted carrier power of the sharing cell of the UMTS network to the maximum cell transmit power is less than a fourth sub-threshold.

When the proportion of the transmitted carrier power of the sharing cell of the UMTS network to the maximum cell transmit power is less than the fourth sub-threshold, S406 is performed, or otherwise, S409 is performed.

S406. The NodeB determines whether the proportion of the transmitted carrier power of the sharing cell of the UMTS network to the maximum cell transmit power is less than a fifth sub-threshold.

When the proportion of the transmitted carrier power of the sharing cell of the UMTS network to the maximum cell transmit power is less than the fifth sub-threshold, S407 is performed, or otherwise, S408 is performed.

S407. The NodeB determines that a time proportion of a sharing time period in which the sharing cell of the UMTS network and a sharing cell of the LTE network share a shared frequency to one period is a first proportion.

After determining that the time proportion of the sharing time period to one period is the first proportion, the NodeB enters a next determining period.

S408. The NodeB determines that a time proportion of a sharing time period in which the sharing cell of the UMTS network and a sharing cell of the LTE network share a shared frequency to one period is a second proportion.

After determining that the time proportion of the sharing time period to one period is the second proportion, the NodeB enters a next determining period.

S409. The NodeB determines that a time proportion of a sharing time period in which the sharing cell of the UMTS network and a sharing cell of the LTE network share a shared frequency to one period is a third proportion.

After determining that the time proportion of the sharing time period to one period is the third proportion, the NodeB enters a next determining period.

S410. The NodeB determines that the sharing cell of the UMTS network and a sharing cell of the LTE network do not share a shared frequency.

After determining that the sharing cell of the UMTS network and the sharing cell of the LTE network do not share the shared frequency, the NodeB enters a next determining period.

Optionally, in this embodiment, a sequence for performing S401, S402, S403, and S404 is not limited.

Optionally, when the proportion of the cell transmitted carrier power to the maximum cell transmit power is less than 20%, the time proportion of the sharing time period to one period is 75%. When the proportion of the cell transmitted carrier power to the maximum cell transmit power is greater than or equal to 20% and is less than 40%, the time proportion of the sharing time period to one period is 50%. When the proportion of the cell transmitted carrier power to the maximum cell transmit power is greater than or equal to 40% and is less than 60%, the time proportion of the sharing time period to one period is 25%. When the proportion of the cell transmitted carrier power to the maximum cell transmit power is greater than or equal to 60%, the sharing cell of the UMTS network and the sharing cell of the LTE network do not share the shared frequency in the period.

In this embodiment, a NodeB periodically obtains load information of a base cell of an LTE network and load information of a sharing cell of a UMTS network, saves the two pieces of information in a global variable, and performs periodical sharing determining on this basis, so that a sharing state of a shared frequency can be adjusted in time. In addition, the NodeB can adjust duration of a sharing time period in each period in time according to a change in a traffic volume of the sharing cell of the UMTS network. Therefore, while ensuring a traffic requirement of the sharing cell of the UMTS network, as much traffic support as possible is provided for the LTE network, so that spectrum resource utilization is improved.

Figure 5A:
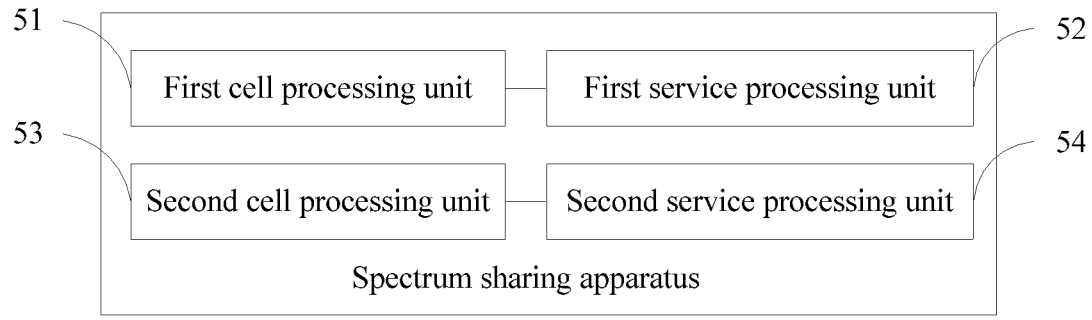
FIG. 5A is a schematic structural diagram of a spectrum sharing apparatus according to a fifth embodiment of the present invention.

FIG. 5A is a schematic structural diagram of a spectrum sharing apparatus according to a fifth embodiment of the present invention. As shown in FIG. 5A, the spectrum sharing apparatus in this embodiment includes a first cell processing unit 51, a first service processing unit 52, a second cell processing unit 53, and a second service processing unit 54.

The first cell processing unit 51 is configured to establish a first sharing cell at a shared frequency. A common channel of the sharing cell is a first common channel. The first common channel may include at least one of a common pilot channel, a synchronization channel, and a broadcast channel.

The first service processing unit 52 is configured to establish a service of user equipment of a first-standard network in the first sharing cell, and transmit data on a data radio bearer of the service of the user equipment of the first-standard network.

The second cell processing unit 53 is configured to establish a second sharing cell at the shared frequency.

The second service processing unit 54 is configured to establish a service of user equipment of a second-standard network in the second sharing cell.

The first service processing unit 52 is further configured to: when the first sharing cell and the second sharing cell share the shared frequency, suspend the data transmission on the data radio bearer of the service of the user equipment of the first-standard network, and retain the first common channel and a signaling radio bearer of the service of the user equipment of the first-standard network. The second service processing unit 54 is further configured to: when the first sharing cell and the second sharing cell share the shared frequency, start data transmission on a data radio bearer of the service of the user equipment of the second-standard network.

Optionally, the signaling radio bearer of the service of the user equipment of the first-standard network may be carried on a dedicated physical data channel and a dedicated physical control channel, and the data radio bearer of the service of the user equipment of the first-standard network may be carried on a high speed downlink packet access data channel.

Figure 5B:
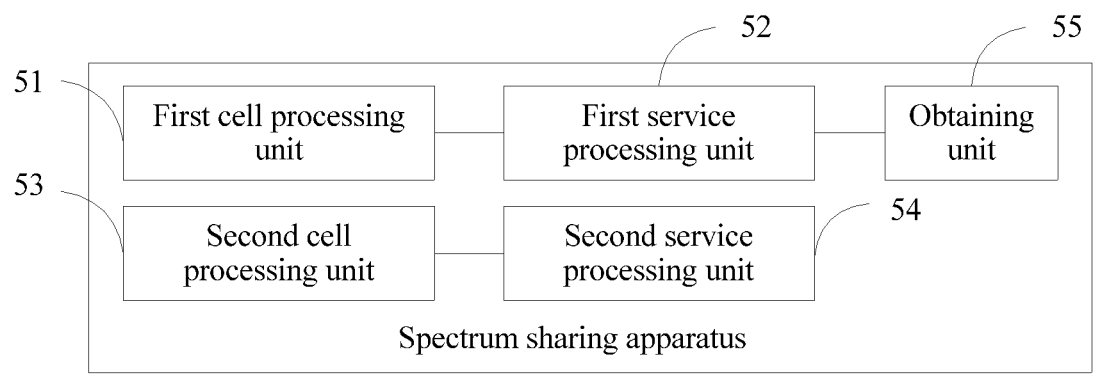
FIG. 5B is a schematic structural diagram of a spectrum sharing apparatus according to a sixth embodiment of the present invention.

Optionally, on the basis of the spectrum sharing apparatus in the fifth embodiment, as shown in FIG. 5B, a spectrum sharing apparatus in a sixth embodiment of the present invention further includes an obtaining unit 55.

The obtaining unit 55 is configured to obtain load information of a base cell of the second-standard network, and obtain load information of the first sharing cell. The obtaining unit 55 is connected to the first service processing unit 52, and is configured to provide the load information of the base cell of the second-standard network and the load information of the first sharing cell for the first service processing unit 52.

Optionally, the first service processing unit 52 may be further configured to determine, according to the load information of the base cell of the second-standard network and the load information of the first sharing cell, whether the first sharing cell and the second sharing cell share the shared frequency. The load information of the base cell of the second-standard network may include radio bearer utilization of the base cell of the second-standard network.

Optionally, the first service processing unit 52 may be further configured to: when the radio bearer utilization of the base cell of the second-standard network is greater than a first threshold and the load information of the first sharing cell is less than a second threshold, determine that the first sharing cell and the second sharing cell share the shared frequency.

Optionally, the first service processing unit 52 may be further configured to determine, according to the load information of the first sharing cell, duration of the data transmission on the data radio bearer of the service of the user equipment of the second-standard network. The load information of the first sharing cell may include a proportion of cell transmitted carrier power of the first sharing cell to maximum cell transmit power.

Optionally, the first service processing unit 52 may be further configured to determine, according to the proportion of the cell transmitted carrier power of the first sharing cell to the maximum cell transmit power, the duration of the data transmission on the data radio bearer of the service of the user equipment of the second-standard network, where the duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

Optionally, the second service processing unit 54 may be further configured to: when the first sharing cell and the second sharing cell share the shared frequency, use an average value of last N1 channel quality indicator values of the second sharing cell in last sharing as a channel quality indicator value that is in a first time period that is an initial time period in current sharing of the second sharing cell. N1 is a positive integer. Therefore, a co-channel interference signal of the first-standard network does not affect the user equipment of the second-standard network.

Optionally, the obtaining unit 55 may be further configured to: after the first sharing cell and the second sharing cell share the shared frequency, obtain load information of a base cell of the second-standard network, and obtain load information of the first sharing cell.

Optionally, the first service processing unit 52 may be further configured to determine, according to the load information of the base cell of the second-standard network and the load information of the first sharing cell, whether the first sharing cell and the second sharing cell continue to share the shared frequency. The load information of the base cell of the second-standard network may include radio bearer utilization of the base cell of the second-standard network. The load information of the first sharing cell may include at least one of the following: a quantity of dedicated channel users of the first-standard network, non-high-speed downlink packet access power, and a proportion of cell transmitted carrier power to maximum cell transmit power.

Optionally, the first service processing unit 52 may be further configured to: when the radio bearer utilization of the base cell of the second-standard network is less than or equal to a first threshold or the load information of the first sharing cell is greater than or equal to a second threshold, determine that the first sharing cell and the second sharing cell do not continue to share the shared frequency. The second threshold may include a first sub-threshold, a second sub-threshold, a third sub-threshold, or the like.

Optionally, the first service processing unit 52 may be further configured to: when at least one of the following conditions is met, the conditions including the quantity of dedicated channel users in the first sharing cell of the first-standard network is greater than or equal to the first sub-threshold, the non-high-speed downlink packet access power of the first sharing cell is greater than or equal to the second sub-threshold, and the proportion of the cell transmitted carrier power of the first sharing cell to the maximum cell transmit power is greater than or equal to the third sub-threshold, determine that the first sharing cell and the second sharing cell do not continue to share the shared frequency.

Optionally, the second service processing unit 54 may be further configured to: when the first service processing unit 52 determines that the first sharing cell and the second sharing cell do not continue to share the shared frequency, suspend the data transmission on the data radio bearer of the service of the user equipment of the second-standard network. The first service processing unit 52 may be further configured to: when the first service processing unit 52 determines that the first sharing cell and the second sharing cell do not continue to share the shared frequency, start the data transmission on the data radio bearer of the service of the user equipment of the first-standard network, and retain the first common channel and the signaling radio bearer of the service of the user equipment of the first-standard network.

Optionally, the first service processing unit 52 may be further configured to: when the first sharing cell and the second sharing cell do not continue to share the shared frequency, use an average value of last N2 channel quality indicator values of the first sharing cell in last non-sharing as a channel quality indicator value that is in a second time period that is an initial time period in current non-sharing of the first sharing cell. N2 is a positive integer. Therefore, a co-channel interference signal of the second-standard network does not affect the user equipment of the first-standard network.

Optionally, the obtaining unit 55 may be further configured to: when the load information of the base cell of the second-standard network is greater than a first threshold and the load information of the first sharing cell is greater than or equal to a second threshold, obtain load information of a base cell of the first-standard network.

Optionally, the first service processing unit 52 may be further configured to: when the load information of the base cell of the first-standard network is less than a third threshold, hand over some user equipment in the first sharing cell to the base cell of the first-standard network. Therefore, it is easier for a condition of the sharing cell, such as a quantity of remaining dedicated channel users of the first-standard network, the non-high-speed downlink packet access power, or the proportion of the cell transmitted carrier power to the maximum cell transmit power, to meet a trigger condition for sharing the shared frequency by the first sharing cell and the second sharing cell.

Optionally, the first service processing unit 52 may be further configured to: when the load information of the first sharing cell is less than a fourth threshold and the load information of the base cell of the first-standard network is greater than a fifth threshold, hand over some user equipment in the base cell of the first-standard network to the first sharing cell.

Optionally, the first service processing unit 52 may be further configured to: when a traffic volume of specific user equipment in the first sharing cell is less than a sixth threshold, hand over the user equipment to the base cell of the first-standard network.

Optionally, the obtaining unit 55 may be further configured to: before the first sharing cell is established, receive a cell establishment message delivered by a radio network controller. The cell establishment message may include at least one of the following: identification information of the first sharing cell, user equipment handover information, cell status setting information, and intra-frequency measurement configuration information.

Optionally, the first cell processing unit 51 may be further configured to establish the first sharing cell according to the cell establishment message.

Optionally, the first cell processing unit 51 may be further configured to determine a to-be-established cell as the first sharing cell according to the identification information of the first sharing cell.

Optionally, the first cell processing unit 51 may be further configured to adjust at least one of the third threshold, the fourth threshold, the fifth threshold, and the sixth threshold according to the user equipment handover information, so that it is easier for user equipment on an edge of the first sharing cell to trigger inter-frequency handover or inter-RAT handover, and it is relatively difficult for user equipment of inter-frequency or inter-RAT to be handed over to the first sharing cell.

Optionally, the first cell processing unit 51 may be further configured to set a status of the first sharing cell to a forbidden state according to the cell status setting information, so that idle-state user equipment is not allowed to enter the first sharing cell.

Optionally, the first cell processing unit 51 may be further configured to use received signal code power as a measurement quantity in intra-frequency measurement according to the intra-frequency measurement configuration information.

Optionally, the first service processing unit 52 may be further configured to hand over user equipment by means of blind handover or measurement-based handover.

Optionally, the first service processing unit 52 may be further configured to: when the first sharing cell and the second sharing cell share the shared frequency, suspend, in an uplink direction of the first sharing cell, the data transmission on the data radio bearer of the service of the user equipment of the first-standard network, and retain the first common channel and the signaling radio bearer of the service of the user equipment of the first-standard network. The second service processing unit 54 may be further configured to: when the first sharing cell and the second sharing cell share the shared frequency, start, in an uplink direction of the second sharing cell, the data transmission on the data radio bearer of the service of the user equipment of the second-standard network.

Optionally, the first service processing unit 52 may be further configured to: when the first sharing cell and the second sharing cell share the shared frequency, suspend, in a downlink direction of the first sharing cell, the data transmission on the data radio bearer of the service of the user equipment of the first-standard network, and retain the first common channel and the signaling radio bearer of the service of the user equipment of the first-standard network. The second service processing unit 54 may be further configured to: when the first sharing cell and the second sharing cell share the shared frequency, start, in a downlink direction of the second sharing cell, the data transmission on the data radio bearer of the service of the user equipment of the second-standard network. Therefore, when the first sharing cell and the second sharing cell share the shared frequency, the first common channel and transmission of the signaling radio bearer of the service of the user equipment of the first-standard network are not interrupted, so that a KPI of the first sharing cell is not affected.

Optionally, the first cell processing unit 51 may be further configured to establish one or more first sharing cells.

Optionally, the first cell processing unit 51 and the first service processing unit 52 may be implemented by a same unit, or may be implemented by different units. The second cell processing unit 53 and the second service processing unit 54 may be implemented by a same unit, or may be implemented by different units. The first cell processing unit 51, the first service processing unit 52, the second cell processing unit 53, and the second service processing unit 54 may be implemented by a same unit.

Optionally, the first cell processing unit 51, the first service processing unit 52, the second cell processing unit 53, and the second service processing unit 54 may be different processors. The obtaining unit 55 may be a receiver. The first cell processing unit 51 and the first service processing unit 52 may be a same processor. The second cell processing unit 53 and the second service processing unit 54 may be a same processor.

Optionally, the first cell processing unit 51 and the first service processing unit 52 belong to a first base station, and the second cell processing unit 53 and the second service processing unit 54 belong to a second base station. Alternatively, the first cell processing unit 51, the first service processing unit 52, and the obtaining unit 55 belong to a first base station, and the second cell processing unit 53 and the second service processing unit 54 belong to a second base station. The first base station and the second base station may be co-site base stations.

Optionally, the spectrum sharing apparatus provided in this embodiment may be a base station, but this is not limited herein.

All units of the spectrum sharing apparatus provided in this embodiment may be configured to perform a corresponding procedure in the method shown in FIG. 1, FIG. 3A, FIG. 3B, and FIG. 3C, or FIG. 4A and FIG. 4B. A specific working principle is not described again. For details, refer to the descriptions of the method embodiments.

It may be learned from the foregoing description that, according to the spectrum sharing apparatus provided in this embodiment, after a first sharing cell and a second sharing cell are separately established at a shared frequency, a service of user equipment of a first-standard network is established in the first sharing cell, and a service of user equipment of a second-standard network is established in the second sharing cell. Data transmission on a data radio bearer of the service of the user equipment of the first-standard network is suspended, data transmission on a data radio bearer of the service of the user equipment of the second-standard network is started, and a first common channel and a signaling radio bearer of the service of the user equipment of the first-standard network are retained. Therefore, when the first sharing cell and the second sharing cell share the shared frequency, an operation of frequently establishing and deleting a cell does not need to be performed, KPIs of the first sharing cell and the second sharing cell are not affected, and a spectrum resource is fully used according to a change in a traffic volume between the first-standard network and the second-standard network, so that spectrum resource utilization is improved.

Figure 6:
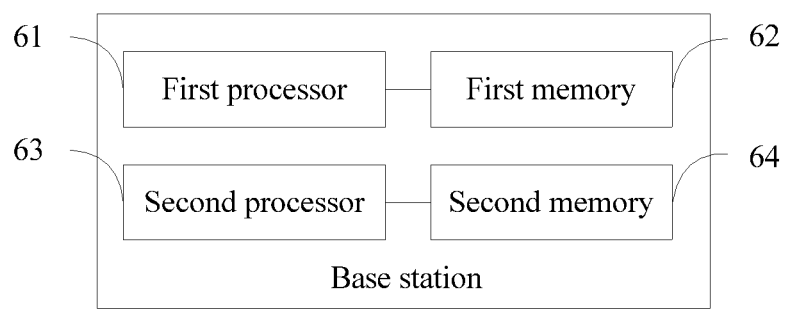
FIG. 6 is a schematic structural diagram of a base station according to a seventh embodiment of the present invention.

To further describe this embodiment of the present invention in detail, a seventh embodiment of the present invention provides a base station. In this embodiment, for content that is the same as that in the fifth and sixth embodiments, refer to detailed descriptions in the fifth and sixth embodiments. This is not described herein again. FIG. 6 is a schematic structural diagram of a base station according to a seventh embodiment of the present invention. As shown in FIG. 6, the base station in this embodiment includes a first processor 61, a first memory 62, a second processor 63, and a second memory 64.

The first memory 62 is configured to store an executable instruction of the first processor.

The instruction stored in the first memory 62 is used to enable the first processor 61 to: establish a first sharing cell of a first-standard network at a shared frequency, establish a service of user equipment of the first-standard network in the first sharing cell, and transmit data on a data radio bearer of the service of the user equipment of the first-standard network.

The second memory 64 is configured to store an executable instruction of the second processor.

The instruction stored in the second memory 64 is used to enable the second processor 63 to establish a second sharing cell of a second-standard network at the shared frequency, and establish a service of user equipment of the second-standard network in the second sharing cell.

The instruction stored in the first memory 62 is further used to enable the first processor 61 to: when the first sharing cell and the second sharing cell share the shared frequency, suspend the data transmission on the data radio bearer of the service of the user equipment of the first-standard network, and retain a first common channel and a signaling radio bearer of the service of the user equipment of the first-standard network.

The instruction stored in the second memory 64 is further used to enable the second processor 63 to start data transmission on a data radio bearer of the service of the user equipment of the second-standard network.

Optionally, the first common channel may include at least one of a common pilot channel, a synchronization channel, and a broadcast channel.

Optionally, the second-standard network may include a base cell. The base cell of the second-standard network and the first sharing cell may be co-sector cells. The instruction stored in the first memory 62 is further used to enable the first processor 61 to: obtain load information of the base cell of the second-standard network, obtain load information of the first sharing cell, and determine, according to the load information of the base cell of the second-standard network and the load information of the first sharing cell, whether the first sharing cell and the second sharing cell share the shared frequency.

Optionally, the load information of the base cell of the second-standard network may include radio bearer utilization. That the instruction stored in the first memory 62 is used to enable the first processor 61 to determine, according to the load information of the base cell of the second-standard network and the load information of the first sharing cell, whether the first sharing cell and the second sharing cell share the shared frequency includes: The instruction stored in the first memory 62 is used to enable the first processor 61 to: when the radio bearer utilization of the base cell of the second-standard network is greater than a first threshold and the load information of the first sharing cell is less than a second threshold, determine that the first sharing cell and the second sharing cell share the shared frequency.

Optionally, the instruction stored in the first memory 62 is further used to enable the first processor 61 to determine, according to the load information of the first sharing cell, duration of the data transmission on the data radio bearer of the service of the user equipment of the second-standard network.

Optionally, the load information of the first sharing cell may include a proportion of cell transmitted carrier power to maximum cell transmit power. That the instruction stored in the first memory 62 is used to enable the first processor 61 to determine, according to the load information of the first sharing cell, duration of the data transmission on the data radio bearer of the service of the user equipment of the second-standard network includes: The instruction stored in the first memory 62 is used to enable the first processor 61 to determine, according to the proportion of the cell transmitted carrier power of the first sharing cell to the maximum cell transmit power, the duration of the data transmission on the data radio bearer of the service of the user equipment of the second-standard network, where the duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

Optionally, the instruction stored in the second memory 64 is further used to enable the second processor 63 to, when the first sharing cell and the second sharing cell share the shared frequency, use an average value of last N1 channel quality indicator values of the second sharing cell in last sharing as a channel quality indicator value that is in a first time period that is an initial time period in current sharing of the second sharing cell. N1 is a positive integer. Therefore, a co-channel interference signal of the first-standard network does not affect the user equipment of the second-standard network.

Optionally, the second-standard network may include a base cell. After the first sharing cell and the second sharing cell share the shared frequency, the instruction stored in the first memory 62 is further used to enable the first processor 61 to: obtain load information of the base cell of the second-standard network, obtain load information of the first sharing cell, and determine, according to the load information of the base cell of the second-standard network and the load information of the first sharing cell, whether the first sharing cell and the second sharing cell continue to share the shared frequency.

Optionally, the load information of the second-standard network may include radio bearer utilization. That the instruction stored in the first memory 62 is used to enable the first processor 61 to determine, according to the load information of the base cell of the second-standard network and the load information of the first sharing cell, whether the first sharing cell and the second sharing cell continue to share the shared frequency includes: The instruction stored in the first memory 62 is used to enable the first processor 61 to: when the radio bearer utilization of the base cell of the second-standard network is less than or equal to a first threshold or the load information of the first sharing cell is greater than or equal to a second threshold, determine that the first sharing cell and the second sharing cell do not continue to share the shared frequency.

Optionally, the load information of the first sharing cell includes at least one of the following: a quantity of dedicated channel users of the first-standard network, non-high-speed downlink packet access power, and a proportion of cell transmitted carrier power to maximum cell transmit power. The second threshold may include a first sub-threshold, a second sub-threshold, a third sub-threshold, or the like. That the instruction stored in the first memory 62 is used to enable the first processor 61 to: when the radio bearer utilization of the base cell of the second-standard network is less than or equal to a first threshold or the load information of the first sharing cell is greater than or equal to a second threshold, determine that the first sharing cell and the second sharing cell do not continue to share the shared frequency includes: The instruction stored in the first memory 62 is used to enable the first processor 61 to: when at least one of the following conditions is met: the quantity of dedicated channel users in the first sharing cell of the first-standard network is greater than or equal to the first sub-threshold, the non-high-speed downlink packet access power of the first sharing cell is greater than or equal to the second sub-threshold, and the proportion of the cell transmitted carrier power of the first sharing cell to the maximum cell transmit power is greater than or equal to the third sub-threshold, determine that the first sharing cell and the second sharing cell do not continue to share the shared frequency.

Optionally, the instruction stored in the second memory 64 is further used to enable the second processor 63 to: when the first sharing cell and the second sharing cell do not continue to share the shared frequency, suspend the data transmission on the data radio bearer of the service of the user equipment of the second-standard network. The instruction stored in the first memory 62 is further used to enable the first processor 61 to: when the first sharing cell and the second sharing cell do not continue to share the shared frequency, start the data transmission on the data radio bearer of the service of the user equipment of the first-standard network, and retain the first common channel and the signaling radio bearer of the service of the user equipment of the first-standard network.

Optionally, the instruction stored in the first memory 62 is further used to enable the first processor 61 to, when the first sharing cell and the second sharing cell do not continue to share the shared frequency, use an average value of last N2 channel quality indicator values of the first sharing cell in last non-sharing as a channel quality indicator value that is in a second time period that is an initial time period in current non-sharing of the first sharing cell. N2 is a positive integer. Therefore, a co-channel interference signal of the second-standard network does not affect the user equipment of the first-standard network.

Optionally, the first-standard network may further include a base cell. The instruction stored in the first memory 62 is further used to enable the first processor 61 to: when the load information of the base cell of the second-standard network is greater than a first threshold and the load information of the first sharing cell is greater than or equal to a second threshold, obtain load information of the base cell of the first-standard network; and when the load information of the base cell of the first-standard network is less than a third threshold, hand over some user equipment in the first sharing cell to the base cell of the first-standard network. Therefore, it is easier for a condition of the sharing cell, such as a quantity of remaining dedicated channel users of the first-standard network, the non-high-speed downlink packet access power, or the proportion of the cell transmitted carrier power to the maximum cell transmit power, to meet a trigger condition for sharing the shared frequency by the first sharing cell and the second sharing cell.

Optionally, the instruction stored in the first memory 62 is further used to enable the first processor 61 to, when the load information of the first sharing cell is less than a fourth threshold and the load information of the base cell of the first-standard network is greater than a fifth threshold, hand over some user equipment in the base cell of the first-standard network to the first sharing cell.

Optionally, the instruction stored in the first memory 62 is further used to enable the first processor 61 to: when a traffic volume of specific user equipment in the first sharing cell is less than a sixth threshold, hand over the user equipment to the base cell of the first-standard network.

Optionally, the instruction stored in the first memory 62 is further used to enable the first processor 61 to receive a cell establishment message delivered by a radio network controller; and establish the first sharing cell at the shared frequency according to the cell establishment message. The cell establishment message may include at least one of identification information of the first sharing cell, user equipment handover information, cell status setting information, and intra-frequency measurement configuration information.

Optionally, the instruction stored in the first memory 62 is further used to enable the first processor 61 to adjust at least one of the third threshold, the fourth threshold, the fifth threshold, and the sixth threshold according to the user equipment handover information, so that it is easier for user equipment on an edge of the first sharing cell to trigger inter-frequency handover or inter-RAT handover, and it is relatively difficult for user equipment of inter-frequency or inter-RAT to be handed over to the first sharing cell.

Optionally, the instruction stored in the first memory 62 is further used to enable the first processor 61 to set a status of the first sharing cell to a forbidden state according to the cell status setting information, so that idle-state user equipment is not allowed to enter the first sharing cell.

Optionally, the instruction stored in the first memory 62 is further used to enable the first processor 61 to use received signal code power as a measurement quantity in intra-frequency measurement according to the intra-frequency measurement configuration information.

Optionally, base stations provided in this embodiment may be co-site base stations. The co-site base stations include a first base station and a second base station. The first processor 61 and the first memory 62 belong to the first base station, and the second processor 63 and the second memory 64 belong to the second base station.

The base station provided in this embodiment may be configured to perform a corresponding procedure in the method shown in FIG. 1, FIG. 3A, FIG. 3B, and FIG. 3C, or FIG. 4A and FIG. 4B. A specific working principle is not described again. For details, refer to the descriptions of the method embodiments.

It may be learned from the foregoing description that, according to the base station provided in this embodiment, after a first sharing cell and a second sharing cell are separately established at a shared frequency, a service of user equipment of a first-standard network is established in the first sharing cell, and a service of user equipment of a second-standard network is established in the second sharing cell. Data transmission on a data radio bearer of the service of the user equipment of the first-standard network is suspended, data transmission on a data radio bearer of the service of the user equipment of the second-standard network is started, and a first common channel and a signaling radio bearer of the service of the user equipment of the first-standard network are retained. Therefore, when the first sharing cell and the second sharing cell share the shared frequency, an operation of frequently establishing and deleting a cell does not need to be performed, KPIs of the first sharing cell and the second sharing cell are not affected, and a spectrum resource is fully used according to a change in a traffic volume between the first-standard network and the second-standard network, so that spectrum resource utilization is improved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A spectrum sharing method, comprising:
    establishing, by a first base station, a first sharing cell of a first-standard network at a shared frequency;
    establishing, by the first base station, a service of user equipment of the first-standard network in the first sharing cell, and transmitting, by the first base station, data on a data radio bearer of the service of the user equipment of the first-standard network;
    establishing, by a second base station, a second sharing cell of a second-standard network at the shared frequency;
    establishing, by the second base station, a service of user equipment of the second-standard network in the second sharing cell;
    suspending, by the first base station when the first sharing cell and the second sharing cell share the shared frequency, data transmission on the data radio bearer of the service of the user equipment of the first-standard network, and retaining a common channel of the first sharing cell and a signaling radio bearer of the service of the user equipment of the first-standard network; and
    starting, by the second base station, data transmission on a data radio bearer of the service of the user equipment of the second-standard network.

2. The method according to claim 1, wherein the second-standard network comprises a base cell, and wherein the method further comprises:
    obtaining, by the first base station, load information of the base cell of the second-standard network;
    obtaining, by the first base station, load information of the first sharing cell; and
    determining, by the first base station according to the load information of the base cell of the second-standard network and the load information of the first sharing cell, whether the first sharing cell and the second sharing cell share the shared frequency.

3. The method according to claim 2, wherein the load information of the base cell of the second-standard network comprises radio bearer utilization; and
    wherein the determining whether the first sharing cell and the second sharing cell share the shared frequency comprises:
        determining, by the first base station, when the radio bearer utilization of the base cell of the second-standard network is greater than a first threshold and the load information of the first sharing cell is less than a second threshold, that the first sharing cell and the second sharing cell share the shared frequency.

4. The method according to claim 3, wherein the method further comprises:
    determining, by the first base station according to the load information of the first sharing cell, a duration of the data transmission on the data radio bearer of the service of the user equipment of the second-standard network.

5. The method according to claim 4, wherein the load information of the first sharing cell comprises a proportion of cell transmitted carrier power to maximum cell transmit power; and
    wherein the determining, by the first base station according to the load information of the first sharing cell, duration of the data transmission on the data radio bearer of the service of the user equipment of the second-standard network comprises:
        determining, by the first base station according to the proportion of the cell transmitted carrier power to the maximum cell transmit power, the duration of the data transmission on the data radio bearer of the service of the user equipment of the second-standard network, wherein the duration of the data transmission on the data radio bearer of the service of the user equipment of the second-standard network increases when the proportion of the cell transmitted carrier power to the maximum cell transmit power decreases, or the duration of the data transmission on the data radio bearer of the service of the user equipment of the second-standard network decreases when the proportion of the cell transmitted carrier power to the maximum cell transmit power increases.

6. The method according to claim 3, wherein the method further comprises:
    using, by the second base station, when the first sharing cell and the second sharing cell share the shared frequency, an average value of last N1 channel quality indicator values of the second sharing cell in last sharing as a channel quality indicator value in a first time period that is an initial time period in current sharing of the second sharing cell, wherein N1 is a positive integer.

7. The method according to claim 1, wherein the second-standard network further comprises a base cell; and
    wherein the method further comprises performing, after the first sharing cell and the second sharing cell share the shared frequency:
        obtaining, by the first base station, load information of the base cell of the second-standard network;
        obtaining, by the first base station, load information of the first sharing cell; and
        determining, by the first base station according to the load information of the base cell of the second-standard network and the load information of the first sharing cell, whether the first sharing cell and the second sharing cell continue to share the shared frequency.

8. The method according to claim 7, wherein the load information of the base cell of the second-standard network comprises radio bearer utilization; and
    wherein the determining whether the first sharing cell and the second sharing cell continue to share the shared frequency comprises:
        determining, by the first base station when the radio bearer utilization of the base cell of the second-standard network is less than or equal to a first threshold or the load information of the first sharing cell is greater than or equal to a second threshold, that the first sharing cell and the second sharing cell do not continue to share the shared frequency.

9. The method according to claim 8, wherein the load information of the first sharing cell comprises at least one of a quantity of dedicated channel users of the first-standard network, non-high-speed downlink packet access power, or a proportion of cell transmitted carrier power to maximum cell transmit power, and wherein the second threshold comprises at least one of a first sub-threshold, a second sub-threshold, and a third sub-threshold; and
    wherein the determining, by the first base station when the radio bearer utilization of the base cell of the second-standard network is less than or equal to a first threshold or the load information of the first sharing cell is greater than or equal to a second threshold, that the first sharing cell and the second sharing cell do not continue to share the shared frequency comprises:
determining, by the first base station, that the first sharing cell and the second sharing cell do not continue to share the shared frequency when at least one first condition is met, the at least one first condition selected from the quantity of dedicated channel users of the first-standard network being greater than or equal to the first sub-threshold, the non-high-speed downlink packet access power being greater than or equal to the second sub-threshold, or the proportion of the cell transmitted carrier power to the maximum cell transmit power being greater than or equal to the third sub-threshold.

10. The method according to claim 8, wherein the method further comprises:
suspending, by the second base station, when the first base station determines that the first sharing cell and the second sharing cell do not continue to share the shared frequency, the data transmission on the data radio bearer of the service of the user equipment of the second-standard network; and
starting, by the first base station, the data transmission on the data radio bearer of the service of the user equipment of the first-standard network, and retaining the common channel of the first sharing cell and the signaling radio bearer of the service of the user equipment of the first-standard network.

11. A spectrum sharing apparatus, comprising:
a first processor;
a first non-transitory computer-readable storage medium storing a first program to be executed by the first processor, the first program including instructions to:
establish a first sharing cell of a first-standard network at a shared frequency; and
establish a service of user equipment of the first-standard network in the first sharing cell, and transmit data on a data radio bearer of the service of the user equipment of the first-standard network;
a second processor; and
a second non-transitory computer-readable storage medium storing a second program to be executed by the second processor, the second program including instructions to:
establish a second sharing cell of a second-standard network at the shared frequency; and
establish a service of user equipment of the second-standard network in the second sharing cell;
wherein the first program further includes instructions to perform, when the first sharing cell and the second sharing cell share the shared frequency:
suspend data transmission on the data radio bearer of the service of the user equipment of the first-standard network; and
retain a common channel of the first sharing cell and a signaling radio bearer of the service of the user equipment of the first-standard network; and
wherein the second program further includes instructions to start data transmission on a data radio bearer of the service of the user equipment of the second-standard network when the first sharing cell and the second sharing cell share the shared frequency.

12. The apparatus according to claim 11, wherein the first program further includes instructions to:
obtain load information of a base cell of the second-standard network, and obtain load information of the first sharing cell; and
determine, according to the load information of the base cell of the second-standard network and the load information of the first sharing cell, whether the first sharing cell and the second sharing cell share the shared frequency.

13. The apparatus according to claim 12, wherein the first program further includes instructions to determine that the first sharing cell and the second sharing cell share the shared frequency when radio bearer utilization of the base cell of the second-standard network is greater than a first threshold and the load information of the first sharing cell is less than a second threshold.

14. The apparatus according to claim 13, wherein the first program further includes instructions to determine, according to the load information of the first sharing cell, a duration of the data transmission on the data radio bearer of the service of the user equipment of the second-standard network.

15. The apparatus according to claim 14, wherein the first program further includes instructions to determine, according to a proportion of cell transmitted carrier power of the first sharing cell to maximum cell transmit power, the duration of the data transmission on the data radio bearer of the service of the user equipment of the second-standard network, wherein the duration of the data transmission on the data radio bearer of the service of the user equipment of the second-standard network increases when the proportion of the cell transmitted carrier power to the maximum cell transmit power decreases, and the duration of the data transmission on the data radio bearer of the service of the user equipment of the second-standard network decreases when the proportion of the cell transmitted carrier power to the maximum cell transmit power increases.

16. The apparatus according to claim 13, wherein the second program further includes instructions to use, when the first sharing cell and the second sharing cell share the shared frequency, an average value of last N1 channel quality indicator values of the second sharing cell in last sharing as a channel quality indicator value in a first time period that is an initial time period in current sharing of the second sharing cell, wherein N1 is a positive integer.

17. The apparatus according to claim 11, wherein the first program further includes instructions to perform, after the first sharing cell and the second sharing cell share the shared frequency:
obtain load information of a base cell of the second-standard network;
obtain load information of the first sharing cell; and
determine, according to the load information of the base cell of the second-standard network and the load information of the first sharing cell, whether the first sharing cell and the second sharing cell continue to share the shared frequency.

18. The apparatus according to claim 17, wherein the first program further includes instructions to determine that the first sharing cell and the second sharing cell do not continue to share the shared frequency when radio bearer utilization of the base cell of the second-standard network is less than or equal to a first threshold or the load information of the first sharing cell is greater than or equal to a second threshold.

19. The apparatus according to claim 18, wherein the first program further includes instructions to determine that the first sharing cell and the second sharing cell do not continue to share the shared frequency when at least one first condition is met, the at least one first condition selected from the quantity of dedicated channel users of the first-standard network being greater than or equal to the first sub-threshold, the non-high-speed downlink packet access power being greater than or equal to the second sub-threshold, or the proportion of the cell transmitted carrier power to the maximum cell transmit power being greater than or equal to the third sub-threshold.

20. The apparatus according to claim 18, wherein the second program further includes instructions to suspend the data transmission on the data radio bearer of the service of the user equipment of the second-standard network in response to determining that the first sharing cell and the second sharing cell do not continue to share the shared frequency; and wherein the first program further includes instructions to perform, when the first service processing unit determines that the first sharing cell and the second sharing cell do not continue to share the shared frequency:

start the data transmission on the data radio bearer of the service of the user equipment of the first-standard network; and retain the common channel of the first sharing cell and the signaling radio bearer of the service of the user equipment of the first-standard network.

\* \* \* \* \*